United States Patent
Acres

(10) Patent No.: US 11,715,343 B2
(45) Date of Patent: **\*Aug. 1, 2023**

(54) ENTERTAINMENT GAME-BASED GAMING DEVICE

(71) Applicant: Acres Technology, Las Vegas, NV (US)

(72) Inventor: John F. Acres, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/243,175

(22) Filed: Apr. 28, 2021

(65) Prior Publication Data
US 2021/0248865 A1  Aug. 12, 2021

Related U.S. Application Data

(63) Continuation of application No. 16/460,126, filed on Jul. 2, 2019, now Pat. No. 11,011,011, which is a
(Continued)

(51) Int. Cl.
*G07F 17/32* (2006.01)
*A63F 13/2145* (2014.01)
(Continued)

(52) U.S. Cl.
CPC ............ *G07F 17/3213* (2013.01); *A63F 9/24* (2013.01); *A63F 13/2145* (2014.09);
(Continued)

(58) Field of Classification Search
CPC ..................................................... G07F 17/32
See application file for complete search history.

(56) References Cited

U.S. PATENT DOCUMENTS 5,321,241 A   6/1994 Craine
6,050,895 A * 4/2000 Luciano, Jr ......... G07F 17/3295
                                                        463/20
(Continued)

FOREIGN PATENT DOCUMENTS

WO   2010/151904 A1   12/2010
WO   2011090746 A1    7/2011
(Continued)

OTHER PUBLICATIONS

U.S. Appl. No. 61/339,187, filed Mar. 1, 2010, Enriched Game Play Environment (Single and/or Multi-Player) for Casino Applications, 20 pages.

*Primary Examiner* — Omkar A Deodhar
(74) *Attorney, Agent, or Firm* — Ballard Spahr LLP

(57) ABSTRACT

Embodiments of this concept are direct to a game that includes a combination of an entertainment game and a gambling game. This game combination provides an entertainment game that retains the playability and fun of a skill game or other non-traditional gambling game while allowing for wagers to still be placed and awards won. In some embodiments, the wager-based gambling game is tied directly into the entertainment game, which provides additional entertainment and excitement. Other embodiments separate some of the aspects of the gambling game from the entertainment game to retain the feel of well known gaming devices while still providing an entertainment game to the player.

20 Claims, 12 Drawing Sheets

Related U.S. Application Data continuation of application No. 16/123,423, filed on Sep. 6, 2018, now Pat. No. 10,373,422, which is a continuation of application No. 15/861,319, filed on Jan. 3, 2018, now Pat. No. 10,121,309, which is a continuation of application No. 15/423,934, filed on Feb. 3, 2017, now Pat. No. 9,886,817, which is a continuation of application No. 12/718,792, filed on Mar. 5, 2010, now Pat. No. 9,600,978.

(51) Int. Cl.
A63F 9/24 (2006.01)
G07F 17/34 (2006.01)

(52) U.S. Cl.
CPC ...... *G07F 17/3225* (2013.01); *G07F 17/3244* (2013.01); *G07F 17/3295* (2013.01); *G07F 17/34* (2013.01)

(56) References Cited

U.S. PATENT DOCUMENTS

| | | | |
|---|---|---|---|
| 6,089,980 A | 7/2000 | Gauselmann | |
| 6,227,972 B1 | 5/2001 | Walker et al. | |
| 6,722,979 B2 * | 4/2004 | Gilmore | G07F 17/3211 463/20 |
| 6,910,962 B2 | 6/2005 | Marks et al. | |
| 7,357,713 B2 | 4/2008 | Marks et al. | |
| 7,427,233 B2 | 9/2008 | Walker et al. | |
| 7,604,538 B2 | 10/2009 | Pacey | |
| 7,771,264 B2 | 8/2010 | Kane et al. | |
| 7,766,739 B2 | 10/2010 | Kane et al. | |
| 7,819,747 B2 | 10/2010 | Kane et al. | |
| 7,918,736 B2 | 4/2011 | Walker et al. | |
| 7,959,502 B2 | 6/2011 | Kane et al. | |
| 7,997,978 B2 | 8/2011 | Kaminkow et al. | |
| 8,025,564 B2 | 9/2011 | Jackson | |
| 8,029,361 B2 | 10/2011 | Hardy et al. | |
| 8,057,297 B2 | 11/2011 | Silvestro | |
| 8,142,283 B2 | 3/2012 | Lutnick et al. | |
| 8,181,864 B1 | 5/2012 | McGhie et al. | |
| 8,246,448 B2 | 8/2012 | Silvestro | |
| 8,282,491 B2 | 10/2012 | Auterio et al. | |
| 8,348,764 B2 | 1/2013 | Cerbini | |
| 8,360,873 B1 | 1/2013 | Wickett et al. | |
| 8,382,586 B2 | 2/2013 | Kelly et al. | |
| 8,419,519 B2 | 4/2013 | Aoki et al. | |
| 9,129,476 B2 | 9/2015 | Hardy et al. | |
| 9,367,993 B2 | 6/2016 | Acres | |
| 9,418,510 B2 | 8/2016 | Baerlocher | |
| 9,600,978 B2 | 3/2017 | Acres | |
| 9,886,817 B2 | 2/2018 | Acres | |
| 10,121,309 B2 | 11/2018 | Acres | |
| 2002/0077173 A1 | 6/2002 | Luciano et al. | |
| 2003/0003988 A1 | 1/2003 | Walker et al. | |
| 2003/0060256 A1 | 3/2003 | Joshi | |
| 2003/0199308 A1 | 10/2003 | Parker | |
| 2003/0199318 A1 | 10/2003 | Nassef | |
| 2003/0216966 A1 | 11/2003 | Saenz et al. | |
| 2004/0014515 A1 | 1/2004 | Tracy et al. | |
| 2005/0032569 A1 | 2/2005 | Turk | |
| 2005/0035552 A1 | 2/2005 | Ibbertson et al. | |
| 2005/0037842 A1 | 2/2005 | Kastner | |
| 2005/0091108 A1 | 4/2005 | Frost | |
| 2006/0068876 A1 | 3/2006 | Kane et al. | |
| 2006/0148559 A1 | 7/2006 | Jeffrey et al. | |
| 2006/0178194 A1 | 8/2006 | Jubinville | |
| 2006/0252501 A1 | 11/2006 | Little | |
| 2007/0060381 A1 | 3/2007 | Weiss | |
| 2007/0077981 A1 | 4/2007 | Hungate et al. | |
| 2008/0039173 A1 | 2/2008 | Walther et al. | |
| 2008/0076542 A1 | 3/2008 | Iddings et al. | |
| 2008/0102931 A1 | 5/2008 | Marks | |
| 2008/0108406 A1 | 5/2008 | Oberberger | |
| 2008/0108424 A1 | 5/2008 | Baerlocher et al. | |
| 2008/0139306 A1 | 6/2008 | Lutnick et al. | |
| 2008/0161111 A1 | 7/2008 | Shuman | |
| 2008/0167106 A1 | 7/2008 | Lutnick | |
| 2008/0254883 A1 | 10/2008 | Patel et al. | |
| 2009/0005160 A1 | 1/2009 | Jones et al. | |
| 2009/0055205 A1 | 2/2009 | Nguyen et al. | |
| 2010/0029376 A1 | 2/2010 | Hardy et al. | |
| 2010/0062840 A1 | 3/2010 | Herrmann | |
| 2010/0255896 A1 | 10/2010 | Walther et al. | |
| 2011/0009187 A1 | 1/2011 | Mastropietro | |
| 2011/0092267 A1 | 4/2011 | Hardy et al. | |
| 2011/0151957 A1 | 6/2011 | Falciglia | |
| 2011/0269521 A1 | 11/2011 | Walther et al. | |
| 2011/0281642 A1 | 11/2011 | Hardy et al. | |
| 2011/0287823 A1 | 11/2011 | Guinn et al. | |
| 2013/0029745 A1 | 1/2013 | Kelly et al. | |
| 2013/0116042 A1 | 5/2013 | Mosley et al. | |
| 2013/0237314 A1 | 9/2013 | Cannon et al. | |
| 2013/0252693 A1 | 9/2013 | Amone et al. | |
| 2016/0284168 A1 | 9/2016 | Acres | |
| 2017/0148253 A1 | 5/2017 | Acres | |
| 2017/0301184 A1 | 10/2017 | Acres | |
| 2018/0130289 A1 | 5/2018 | Acres | |
| 2018/0253939 A1 | 9/2018 | Acres | |
| 2019/0005765 A1 | 1/2019 | Acres | |
| 2019/0043311 A1 | 2/2019 | Acres | |
| 2019/0325694 A1 | 10/2019 | Acres | |

FOREIGN PATENT DOCUMENTS

| | | |
|---|---|---|
| WO | 2012145393 A1 | 10/2012 |
| WO | 2013/020141 A1 | 2/2013 |
| WO | 2013/163330 A1 | 10/2013 |
| WO | 2014/074271 A1 | 5/2014 |

\* cited by examiner

ENTERTAINMENT GAME-BASED GAMING DEVICE

CROSS REFERENCE TO RELATED APPLICATIONS

This application is a continuation of U.S. patent application Ser. No. 16/460,126, filed Jul. 2, 2019, which is a continuation of U.S. patent application Ser. No. 16/123,423, filed Sep. 6, 2018, now U.S. Pat. No. 10,373,422, issued Aug. 6, 2019, which is a continuation of U.S. patent application Ser. No. 15/861,319, filed Jan. 3, 2018, now U.S. Pat. No. 10,121,309, issued Nov. 6, 2018, which is a continuation of U.S. patent application Ser. No. 15/423,934, filed Feb. 3, 2017, now U.S. Pat. No. 9,886,817, issued Feb. 6, 2018, which is a continuation of U.S. patent application Ser. No. 12/718,792, filed Mar. 5, 2010, now U.S. Pat. No. 9,600,987, issued Mar. 21, 2017, which is incorporated herein by reference in its entirety.

FIELD OF THE INVENTION

This disclosure relates generally to gaming devices, and more particularly to gaming devices configured to provide an entertainment game as part of gaming session.

BACKGROUND

Game outcomes on gaming devices are typically determined at random where winning outcomes are awarded to a player in the form of money, credits, promotions, prizes, or other incentives, and losing outcomes typically result only in a lost wager. Player excitement is typically generated by providing the possibility of winning large awards for a relatively meager wager. Indeed, for most players, the excitement and gratification of gambling is tied to achieving wins. While these players will endure certain periods of loss, players will often press the spin and/or bet buttons as quickly as possible to pass through the losses to get to another win. Business principles require that most outcomes not be large winning outcomes for the player. Thus, many gambling sessions include extended periods that are devoid of large winning outcomes. Even during a more balanced gaming session, a great portion of time on a gaming device is spent watching reels spin (poker hands played, etc.) with a resulting loss. It is understood that these losses must be balanced with giving the player some incentive to keep playing, and casinos look for ways to maintain player interest in the gaming device besides providing wins.

One way to keep a player at a gaming device while they are experiencing a string of losses is to provide other incentives or entertainment to the player. For example, a player belonging to a player club will continue to earn points toward player club rewards even when they are not winning at the gaming device. Some gaming establishments have provided televisions with sport games or other programming to provide player entertainment during gaming sessions. However, while some of these gaming devices have been configured to provide other types of incentives or entertainment for the player to keep them at the gaming machines during losing stretches, players often ignore these distractions and focus only on the game in front of them.

DETAILED DESCRIPTION

Figure 1:
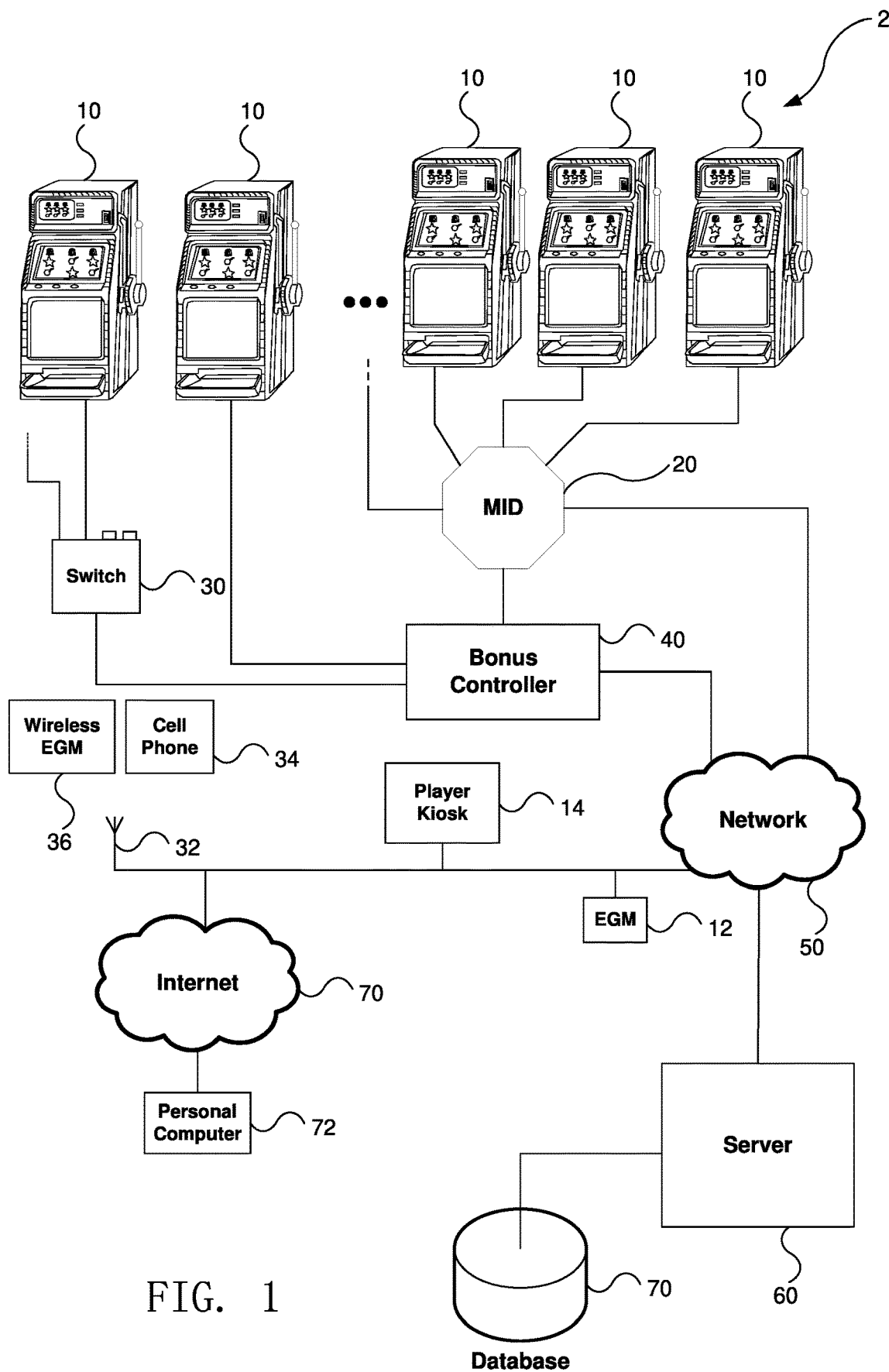
FIG. 1 is a system diagram illustrating various components of a gaming system according to embodiments of the invention.

FIG. 1 is a system diagram illustrating various components of a gaming system according to embodiments of the invention. Referring to FIG. 1, the gaming system 2 includes several gaming devices, also referred to as Electronic Gaming Machines (EGMs) 10 that are connected to a gaming network 50 through various communication mechanisms.

In general, a gaming network 50 connects any of a number of EGMs 10, or other gaming devices, such as those described below, for central management. Accounting and other functions may be served by a connected server 60 and database 70. For example many player tracking functions, bonusing systems, and promotional systems may be centrally administered from the server 60 and database 70. In some embodiments there may be multiple servers 60 and databases 70, each performing different functions. In other embodiments functions may be combined and operate on a single or small group of servers 60, each with their own database 70 or combined databases.

Many of the EGMs 10 of FIG. 1 connect to the gaming network 50 through a Machine Interface Device, MID 20. In general, the MID 20 is a multi-protocol interface that monitors communication between the gaming network 50 and the EGM 10. In a common embodiment, the MID 20 communicates to the EGM 10 through a standard gaming network port, using a standard gaming network protocol, SAS, which is well known in the gaming industry. Most modern games include at least one communication port, which is commonly a SAS port or a port for another communication protocol. The MID 20, along with its various functions and communication methods is described in detail with reference to FIGS. 3A and 3B below.

Other EGMs 10 in FIG. 1 connect to the gaming network 50 through a bonus controller 40, which may be coupled between the gaming network 50 and gaming device 10. The bonus controller 40 generally communicates through a non-SAS protocol, such as another well-known communication protocol known as GSA. GSA is typically carried over an Ethernet network, and thus the bonus controller 40 includes an Ethernet transceiver, which is described with reference to FIG. 4 below. Because the bonus controller 40 communication may be Ethernet based, a switch 30 may be used to extend the number of devices that may be coupled to the bonus controller 40. The bonus controller 40 and/or the MID 20 may create or convert data or information received according to a particular protocol, such as SAS, into data or information according to another protocol, such as GSA. In this way the MID 20 and bonus controller 40 are equipped to communicate, seamlessly, between any EGM 10 and gaming network 50 no matter which communication protocols are in use. Further, because the MID 20 and bonus controller 40 are programmable, and include multiple extensible communication methods, as described below, they are capable of communicating with EGMs 10 that will communicate using protocols and communication methods developed in the future.

Other games or devices on which games may be played are connected to the gaming network using other connection and/or communication methods. For instance, an EGM 12 may couple directly to the network 50 without any intervening hardware, other than hardware that is built into the EGM 12 to connect it to the network 50. Likewise, a player kiosk 14 may be directly coupled to the gaming network. The player kiosk 14 allows players, managers, or other personnel to access data on the gaming network 50, such as a player tracking record, and/or to perform other functions using the network. For example, a player may be able to check the current holdings of the player account, transfer balances, redeem player points for credits, cash, or other merchandise or coupons, such as food or travel coupons, for instance.

A wireless transceiver 32 couples the gaming network 50 to a wireless EGM 36, such as a handheld device, or, through a cell phone or other compatible data network, the transceiver 32 connects to a cellular phone 34. The cellular phone 34 may be a "smart phone," which in essence is a handheld computer capable of playing games or performing other functions on the gaming network 50, as described in some embodiments of the invention.

The gaming network 50 also couples to the internet 70, which in turn is coupled to a number of computers, such as the personal computer 72 illustrated in FIG. 1. The personal computer 72 may be used much like the kiosk 14, described above, to manage player tracking or other data kept on the gaming network 50. More likely, though, is that the personal computer 72 is used to play actual games in communication with the gaming network 50. Player data related to games and other functions performed on the personal computer 72 may be tracked as if the player were playing on an EGM 10.

In general, in operation, a player inserts a starting credit into one of the games, such as an EGM 10. The EGM 10 sends data through its SAS or other data communication port through the MID 20 and/or bonus controller 50 to the gaming network 50. Various servers 60 and databases 70 collect information about the gameplay on the EGM 10, such as wagers made, results, various pressing of the buttons on the EGM 10, for example. In addition, the SAS port on the EGM 10 may also be coupled, through the MID 20 as described below, to other systems, such as player tracking systems, accounting, and ticketing systems, such as Ticket-In-Ticket-Out (TITO) systems.

In addition, the EGM 10 accepts information from systems external to the EGM itself to cause the EGM 10 to perform other functions. For example, these external systems may drive the EGM 10 to issue additional credits to the player. In another example, a promotional server may direct the EGM 10 to print a promotional coupon on the ticket printer of the EGM.

The bonus controller 40 is structured to perform some of the above-described functions as well. For example, in addition to standard games on the EGM 10, the bonus controller 40 is structured to drive the EGM 10 to pay bonus awards to the player based on any of the factors, or combination of factors, related to the EGM 10, the player playing the EGM 10, particular game outcomes of the game being played, or other factors.

In this manner, the combination of the bonus controller 40 and MID 20 are a sub-system capable of interfacing with each of the EGMs on a gaming network 50. Through this interface, the MID 20 may gather data about the game, gameplay, or player, or other data on the EGM 10, and forward it to the bonus controller 40. The bonus controller 40 then uses such collected data as input and, when certain conditions are met, sends information and/or data to the EGM 10 to cause it to perform certain functions.

In a more detailed example, suppose a player is playing an EGM 10 coupled to the MID 20 and the bonus controller 40 described above. The player inserts a player tracking card so the gaming network 50 knows the player identity. The MID 20 also stores such identifying information, or perhaps stores only information that the player is a level-2 identified player, for instance. The MID 20 passes such information to the bonus controller 40, which has been programmed to provide a welcome-back bonus to any level-2 player after he or she has played two games. Gameplay on the EGM 10 continues and, after the player plays two games, the bonus controller 40 instructs the EGM 10 to add an additional 40 credits to the EGM 10 as the welcome-back bonus. Such monitoring and control of the EGM 10 can occur in conjunction with, but completely separate from any player tracking or bonusing function that is already present on the gaming network 50. In other words, the server 60, when structured at least in part as a bonusing server, may be set to provide a time-based bonus of 10 credits for every hour played by the player of the EGM 10. The above-described welcome-back bonus may be managed completely separately through the bonus controller 40 and MID 20. Further, all of the actions on the EGM 10 caused by the bonus controller 40 are also communicated to the standard accounting, tracking, and other systems already present on the gaming network 50.

Figure 2:
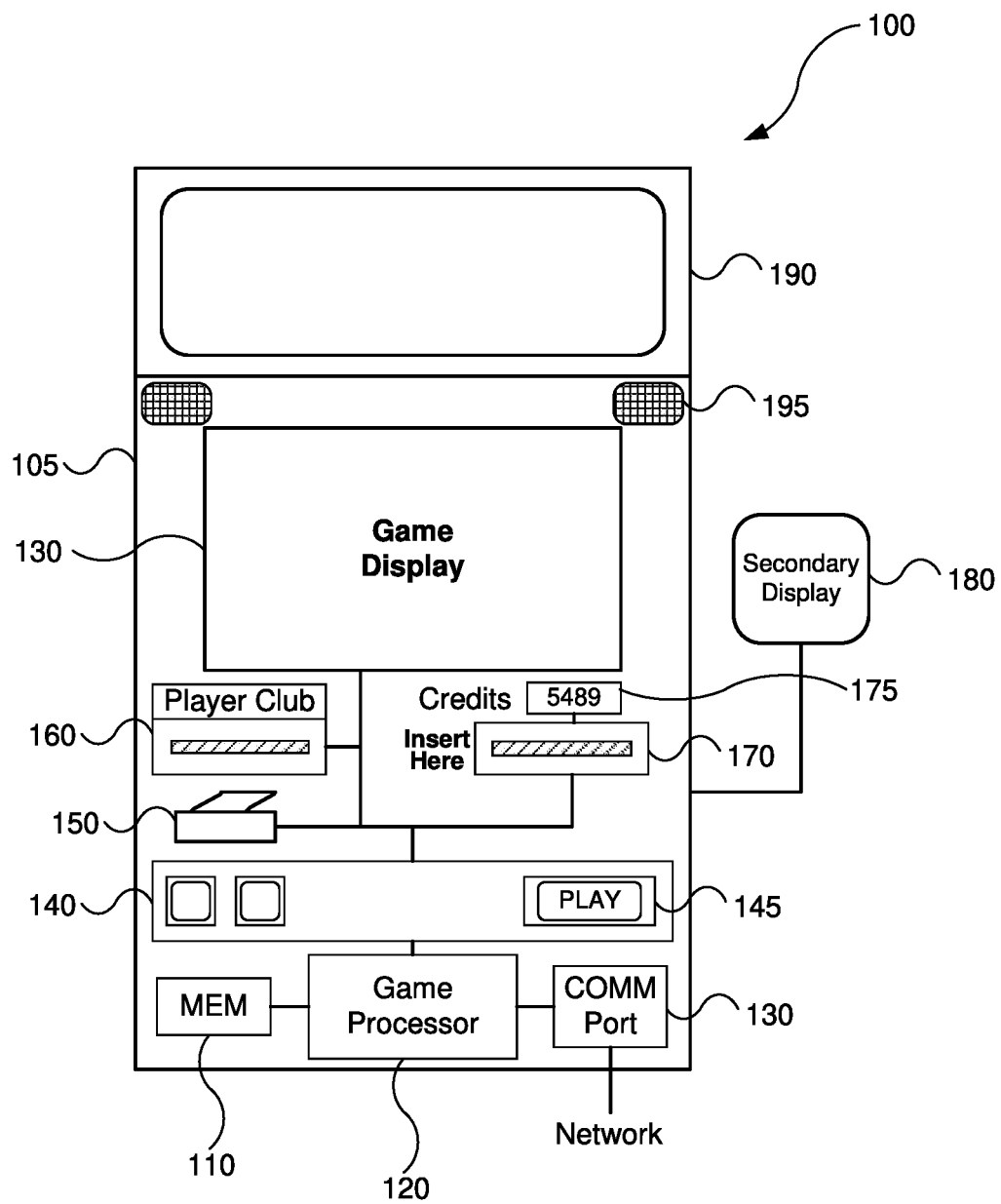
FIG. 2 is a functional block diagram that illustrates an example gaming device that can be a part of the gaming system shown in FIG. 1.

FIG. 2 is a functional block diagram that illustrates an example gaming device that can be a part of the gaming system shown in FIG. 1. Referring to FIG. 2, the illustrated gaming device 100 is an example of the EGMs 10, 12 that are shown in FIG. 1. These EGMs 10, 12 may include all types of electronic gaming machines, such as physical reel slot machines, video slot machines, video poker gaming devices, video blackjack machines, keno games, and any other type of devices may be used to wager monetary-based credits on a game of chance. As mentioned above, various other types of gaming devices may be connected to the network 50 (FIG. 1) such as wireless gaming devices 36, computers used for gaming purposes 72, cellular phones 34, multi-player gaming stations, server-based gaming terminals, etc.

Returning to FIG. 2, the illustrated gaming device 100 includes a cabinet 105 to house various parts of the gaming device 100, thereby allowing certain components to remain securely isolated from player interference, while providing access to player input/output devices so that the player may interact with the gaming device. The securely housed components include the game processor 120, memory 110, and connection port 130. The game processor 120, depending on the type of gaming device 100, may completely or partially control the operation of the gaming device. For example, if the gaming device 100 is a standalone gaming device, game processor 120 may control virtually all of the operations of the gaming device and attached equipment. In other configurations, the game processor 120 may implement instructions generated by or communicated from a remote server (e.g., server 60 shown in FIG. 1) or other controller. For example, the game processor 120 may be responsible for running a base game of the gaming device 100 and executing instructions received over the network 50 from a bonus server or player tracking server. In a server-based gaming environment, the game processor 120 may simply act as a terminal to perform instructions from a remote server that is running game play on the gaming device 100.

The memory 110 is connected to the game processor 120 and may be configured to store various game information about gameplay or player interactions with the gaming device 100. This memory may be volatile (e.g., RAM), non-volatile (e.g., flash memory), or include both types of memory. The connection port 130 is also connected to the game processor 120. This connection port 130 typically connects the gaming device 100 to a gaming network, such as the gaming network 50 described above. The connection port 130 may be structured as a serial port, parallel port, Ethernet port, optical connection, wireless antenna, or any other type of communication port used to transmit and receive data. Although only one connection port 130 is shown in FIG. 1, the gaming device 100 may include multiple connection ports. As described above, in many existing gaming devices, this connection port 130 is a serial connection port utilizing a SAS protocol to communicate to one or more remote game servers, such as player tracking servers, bonus servers, accounting servers, etc.

The player input/output devices housed by the gaming cabinet 105 include a game display 130, a button panel 140 having one or more buttons 145, a ticket printer 150, a bill/ticket reader 170, a credit meter 175, a player club interface device 160, and one or more game speakers 195. Various gaming devices may include fewer or more input/output devices (e.g., a game handle, a coin acceptor, a coin hopper, etc.) depending upon the configuration of the gaming device.

The gaming display 130 may have mechanical spinning reels, a video display, or include a combination of both spinning reels and a video display, or use other methods to display aspects of the gameplay to the player. If the gaming display 130 is a video display, the gaming display may include a touch screen to further allow the player to interact with game indicia, soft buttons, or other displayed objects. The button panel 140 allows the player to select and place wagers on the game of chance, as well as allowing the player to control other aspects of gaming. For example, some gaming devices allow the player to press a button 145 to signal that he or she requires player assistance. Other buttons may bring up a help menu and/or game information. The buttons 145 may also be used to play bonuses or make selections during bonus rounds.

Ticket printers 150 have relatively recently been included on most gaming devices to eliminate the need to restock coin hoppers and allow a player to quickly cash-out credits and transfer those credits to another gaming device. The tickets can also typically be redeemed for cash at a cashier cage or kiosk. The ticket printers are usually connected to the game processor and to a remote server, such as a TITO server to accomplish its intended purpose. In gaming devices that have more than one peripheral device, and which include only a single SAS port, the peripheral devices all share communication time over the connection port 130.

Another peripheral device that often requires communication with a remote server is the player club interface device 160. The player club interface device 160 may include a reader device and one or more input mechanisms. The reader is configured to read an object or indicia identifying the player. The identifying object may be a player club card issued by the casino to a player that includes player information encoded on the card. Once the player is identified by a gaming device, the player club interface device 160 communicates with a remote player server through the connection port 130 to associate a player account with the gaming device 100. This allows various information regarding the player to be communicated between the gaming device 100 and the player server, such as amounts wagered, credits won, and rate of play. In other embodiments, the card reader may read other identifying cards (such as driver licenses, credit cards, etc.) to identify a player. Although FIG. 2 shows the reader as a card reader, other embodiments may include a reader having a biometric scanner, PIN code acceptor, or other methods of identifying a player so as to pair the player with their player tracking account. As is known in the art, it is typically advantageous for a casino to encourage a player to join a player club since this may inspire loyalty to the casino, as well as give the casino information about the player's likes, dislikes, and gaming habits. To compensate the player for joining a player club, the casino often awards player points or other prizes to identified players during game play.

Other input/output devices of the gaming device 100 include a credit meter 175, a bill/ticket acceptor 170, and speakers 195. The credit meter 175 generally indicates the total number of credits remaining on the gaming device 100 that are eligible to be wagered. The credit meter 175 may reflect a monetary unit, such as dollars, or an amount of credits, which are related to a monetary unit, but may be easier to display. For example, one credit may equal one cent so that portion of a dollar won can be displayed as a whole number instead of decimal. The bill/ticket acceptor 170 typically recognizes and validates paper bills and/or printed tickets and causes the game processor 120 to display a corresponding amount on the credit meter 175. The speakers 195 play auditory signals in response to game play or may play enticing sounds while in an "attract-mode," when a player is not at the gaming device. The auditory signals may also convey information about the game, such as by playing a particularly festive sound when a large award is won.

The gaming device 100 may include various other devices to interact with players, such as light configurations, top box displays 190, and secondary displays 180. The top box display 190 may include illuminated artwork to announce a game style, a video display (such as an LCD), a mechanical and/or electrical bonus display (such as a wheel), or other known top box devices. The secondary display 180 may be a vacuum fluorescent display (VFD), a liquid crystal display (LCD), a cathode ray tube (CRT), a plasma screen, or the like. The secondary display 180 may show any combination of primary game information and ancillary information to the player. For example, the secondary display 180 may show player tracking information, secondary bonus information, advertisements, or player selectable game options. The secondary display may be attached to the game cabinet 105 or may be located near the gaming device 100. The secondary display 180 may also be a display that is associated with multiple gaming devices 100, such as a bank-wide bonus meter, or a common display for linked gaming devices.

In operation, typical play on a gaming device 100 commences with a player placing a wager on a game to generate a game outcome. In some games, a player need not interact with the game after placing the wager and initiating the game, while in other games, the player may be prompted to interact with the gaming device 100 during game play. Interaction between the player and the gaming device 100 is more common during bonuses, but may occur as part of the game, such as with video poker. Play may continue on the gaming device 100 until a player decides to cash out or until insufficient credits remain on the credit meter 175 to place a minimum wager for the gaming device.

Communication between gaming devices, such as those described above, and other devices on gaming systems 2 (FIG. 1) is becoming increasingly more complex. The below-described system illustrates a system and method of communication on modern and future gaming systems.

Figure 3A:
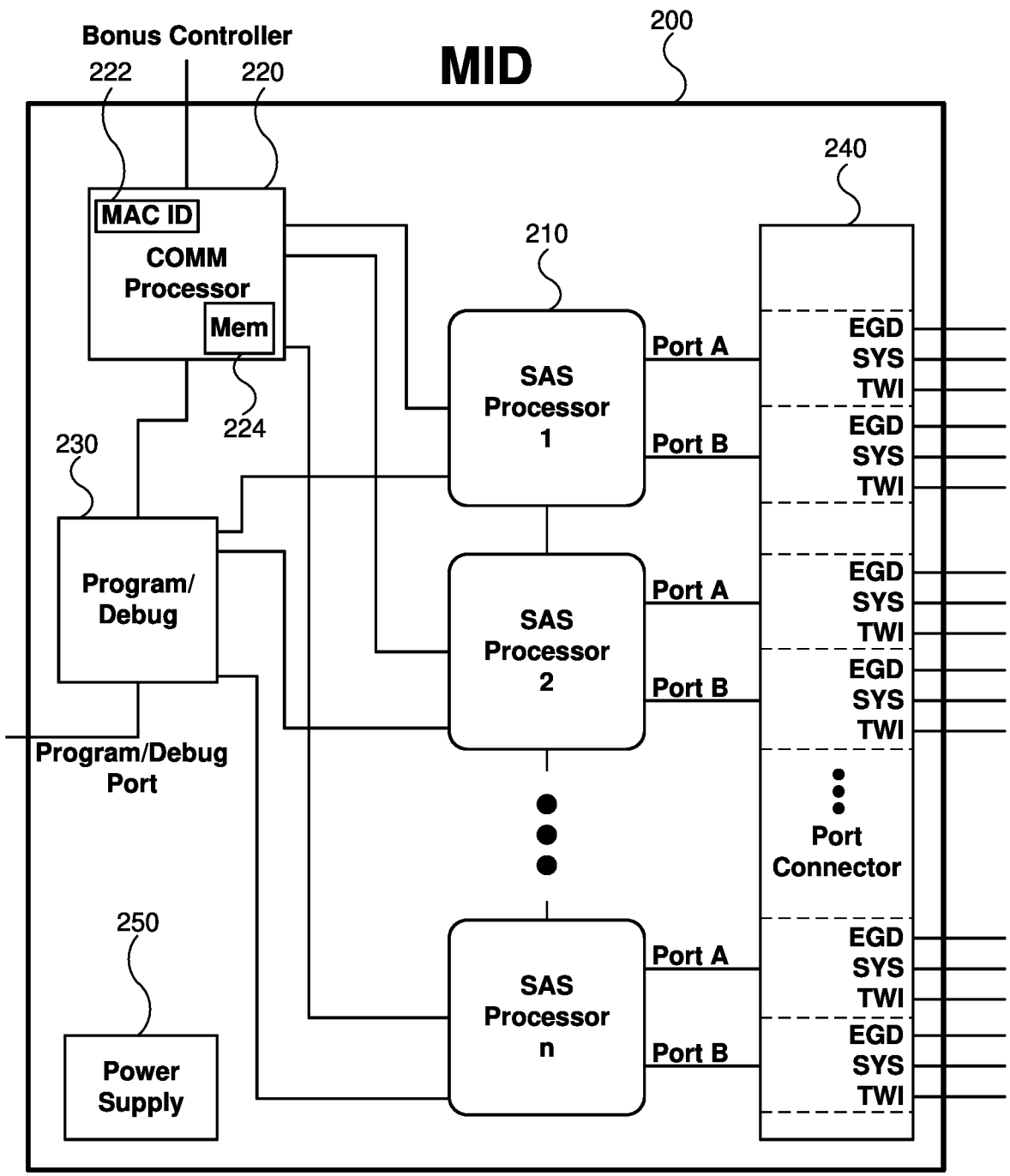
FIG. 3A is a block diagram of an example machine interface device shown in FIG. 1 according to embodiments of the invention.

FIG. 3A is a block diagram of a MID 200, which may be an example of the MID 20 described with reference to FIG. 1 above. The MID 200 includes a set of processors 210, which in this example are termed SAS processors. These SAS processors are capable of accepting, manipulating, and outputting data on a SAS protocol network.

The MID 200 is capable of communicating using other communication protocols as well, as described below. Each processor 210 is structured to couple to two Electronic Gaming Devices (EGDs). EGDs may include, for example, gaming devices such as EGM 10 of FIG. 1, or other electronic gaming devices. In the illustrated embodiment, each SAS processor 210 includes two ports, A and B, each of which may be coupled to an EGD. In turn, the two ports A and B are attached to a set of physical connectors, illustrated here as a single connector 240 for convenience of explanation. Each section of the physical connector 240, delineated by dotted lines, includes three separate pairs of communication lines. Each pair of communication lines is illustrated as a single line—a first serial pair labeled EGD, a second serial pair labeled SYS, and a third communication pair that uses two-wire communication, labeled TWI. Note that each of the ports A and B of the SAS processor 210 includes all three communication pairs. Additionally each of the sections of the physical connector 240 includes wires for a voltage and ground reference, though not depicted in FIG. 3A. In an embodiment of the MID 200 with four SAS processors 210, the physical connector 240 includes up to eight sections, each of which may be embodied by a separate, standard, RJ-45 connector to couple to a matching RJ-45 port in the connected EGM 10, or EGD, as determined by the specific implementation.

As illustrated in FIG. 3A, the first serial pair of Port A couples to EGD. The second serial pair may be coupled to external devices connected to the EGD, as needed. Specifically, some serial data protocols, such as SAS, do not allow EGMs 10 to interface with multiple external devices over a single serial communication path. Such external devices may include, for example, player tracking systems and accounting systems. If a particular EGM 10 is already connected to such a system, and thus its SAS port is "full," the MID 200, and in particular a SAS processor 210, may insert itself "between" the connected system and the EGM 10 by using both of the serial pairs in a particular port of the SAS processor 210 to couple to the EGM 10 and the other connected system, respectively. In operation, the MID 200, through the respective SAS processor 210, passes any information directed from the external device coupled to the SYS communication lines in a particular port to the EGD of the same port, or vice-versa, in real time and without interruption. For example, polls, requests for information, and transmission of information are passed from a connected player tracking system, through the SYS lines of Port A to the serial line EGD of Port A. Only a small communication delay is added using such a communication system, which is well within the tolerance limits of SAS protocol. As a result, both the EGM 10 and external system behave as if the MID 200 were not present.

Further, the third communication pair, a two-wire interface labeled TWI, presents opportunity for expansion to future systems installed on the EGM 10, or a new EGM, so that any data may be communicated between the EGM 10 and the MID 200. The TWI may be connected to card readers, top boxes, ticket dispensers, lighting panels, etc. that are coupled to or work in conjunction with an EGM 10.

Besides simply passing information between communication interfaces, the MID 200 also generates information directly for connected EGDs, which may originate from the MID 200 or from another device as described below. In such a case the SAS processor 210 sends the appropriate data through its appropriate serial line or two-wire interface directly to the desired EGD. Then the EGD may send its own data to its connected peripheral.

Referring back to FIG. 3A, the MID 200 additionally includes a communication processor 220, labeled as COMM processor. The communication processor 220 is coupled to each of the SAS processors 210, a program/debug circuit 230, and to a bonus controller 40 (FIG. 1). In practice, the communication processor 220 may be embodied by a small microprocessor, such as the Atmel ATXMEGA256A3, which is readily available to developers, or any other processor or system capable of performing the desired communication functions.

The communication processor 220 collects and aggregates information from the EGDs that are coupled to each of the SAS processors 210 and sends the aggregated information to the bonus controller 40 of FIG. 1. In some embodiments the communication processor 220 is coupled to the bonus controller 40 through an Ethernet interface. The communication processor is structured to parse information from Ethernet data packets and collect it for use by other systems within the MID 200. Because Ethernet is an addressed protocol, by which messages may be sent to a particular Ethernet address, the communication processor 220 also includes an address of the Ethernet device in a MAC ID 222.

The communication processor 220 may also accept information from the bonus controller 40, or other connected devices, and pass such information to the EGDs coupled to the SAS processors 210. The information may include data, instructions, or commands, for instance.

A memory 224, which may be, for instance Ferroelectric Random Access Memory (FRAM) capable of retaining stored contents for over 10 years may be used by the communication processor for both program and data storage. Of course, other memory technologies may be used instead of or in addition to FRAM.

A program/debug circuit 230 in the MID 200 connects to the communication processor 220 as well as to each of the SAS processors 210. During manufacture of the MID 200, the programming functions of the program/debug circuit 230 load program code to each of the SAS processors 210 as well as the communication processor 220. This initial loading may take place through a program/debug communication port. Further, the program codes stored in each of the SAS processors 210 and the communication processor 230 may be updated through commands and data sent from an external device, such as the bonus controller 40, through the communication processor 220 to the program/debug circuit 230. The program/debug circuit 230 then formats the updated program data for each of the connected SAS processors 210 and communication processor 220, and sends a command to each of the processors to be updated to load the new program code.

Figure 3B:
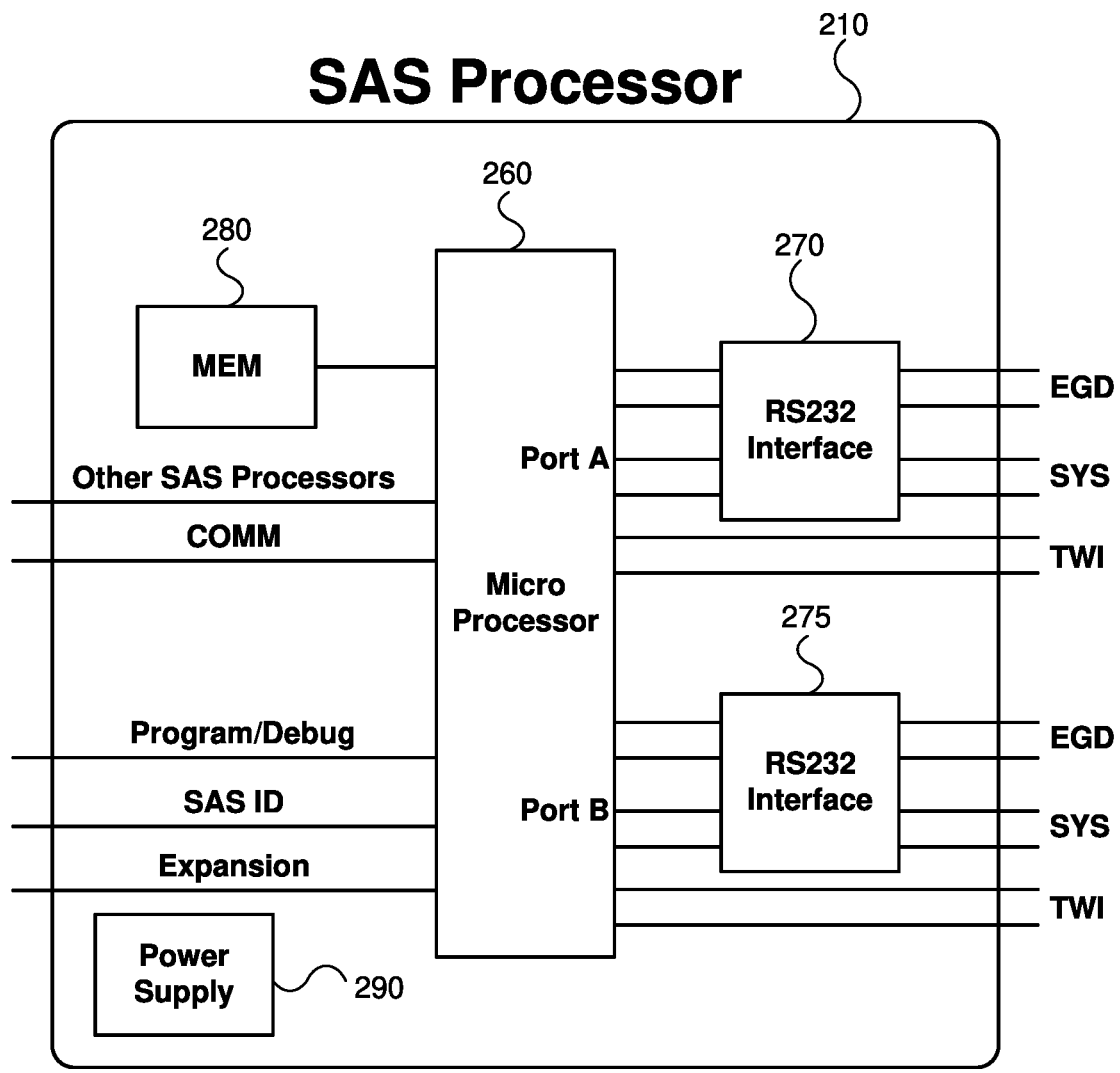
FIG. 3B is a block diagram of an example processor in the machine interface device illustrated in FIG. 3A according to embodiments of the invention.

FIG. 3B is a block diagram of one of the SAS processors 210 of FIG. 3A, which shows additional detail of the SAS processor.

As described above, each of the SAS processors 210 include two separate ports, Port A and Port B, illustrated here as separate ports of a microprocessor 260. The microprocessor 260 in the SAS processor 210 may be embodied by an Atmel ATXMEGA256A3, as described above.

Each of the ports of the microprocessor 260 is structured to couple to an EGD, which may be an EGM 10 of FIG. 1. Each port of the microprocessor 260 includes two serial connections, which in the example embodiment illustrated in FIG. 3B, are RS-232 ports common in the computing industry. The RS-232 ports are contained in an RS-232 interface 270, 275, one for each port of the microprocessor 260. Each of the interfaces 270, 275 includes two separate RS-232 ports, each of which uses a separate transmit and receive wire. Thus, each interface 270, 275 includes a total of four wires. It is convenient to include RS-232 ports as the preferred mode of communication because it is the standard interface for SAS ports of the EGMs 10. In non-standard EGMs 10, such as very old or future devices that may not include SAS ports, communication ports other than RS-232 may be used simply by exchanging or updating the RS-232 interfaces 270, 275. Another possibility is to include an RS-232 translator in any EGM 10 that does not include its own RS-232 interface. As illustrated in FIG. 3B, and as described above, the first of the serial connections, labeled EGD, is connected to an EGD for the particular port of the microprocessor 260, while the second serial connection, labeled SYS is connected to external devices that may be coupled to the particular EGD.

Additionally, and as described above, each SAS processor 210 includes two, two-wire interfaces, illustrated as a separate interface pair and labeled as TWI. In this embodiment, there is one pair for each port of the microprocessor 260. Each two-wire interface creates a bi-directional serial port that may be used for communicating with peripheral or expansion devices associated with the EGD of the particular microprocessor 260, or with other devices on the gaming system 2 of FIG. 1.

The SAS processor 210 includes a memory 280 for storing instruction data of the microprocessor 260 as well as providing data storage used by the SAS processor. The memory 280 is preferably non-volatile memory, such as FRAM that is connected to the microprocessor 260 through a serial interface.

As described above, the SAS processor 210 of the MIB 200 (FIG. 3A) includes multiple connections to other components in the MIB 200, which are illustrated in detail in FIG. 3B. Initially, each SAS processor 210 is coupled to each of the other SAS processors 210 in the MIB 200. In practice, this may accomplished by a direct connection, in which each microprocessor 260 is directly coupled to one another, or such connection may be an indirect connection. In an indirect connection, the microprocessors 260 of each SAS processor 210 is coupled to the communication processor 220 (FIG. 3A). Any data or information to be shared between SAS processors 210 is then originated by or passed through the communication processor 220 to the other SAS processors.

Similarly, as described above, the microprocessor 260 of each SAS processor 210 is coupled to a program/debug circuit 230 for initial or later programming.

To communicate with each SAS processor 210 individually, each SAS processor is given an individual identification number, which may be set for the microprocessor 260 by tying particular data pins of the microprocessor to permanent low or high signals. Using binary encoding, n individual lines are used to identify $2n$ separate processors.

A set of expansion pins couples to the microprocessor 260 of each SAS processor 210 so that each processor may determine system identification and revisions of the MIB 200 and the connected bonus controller 40.

Figure 4:
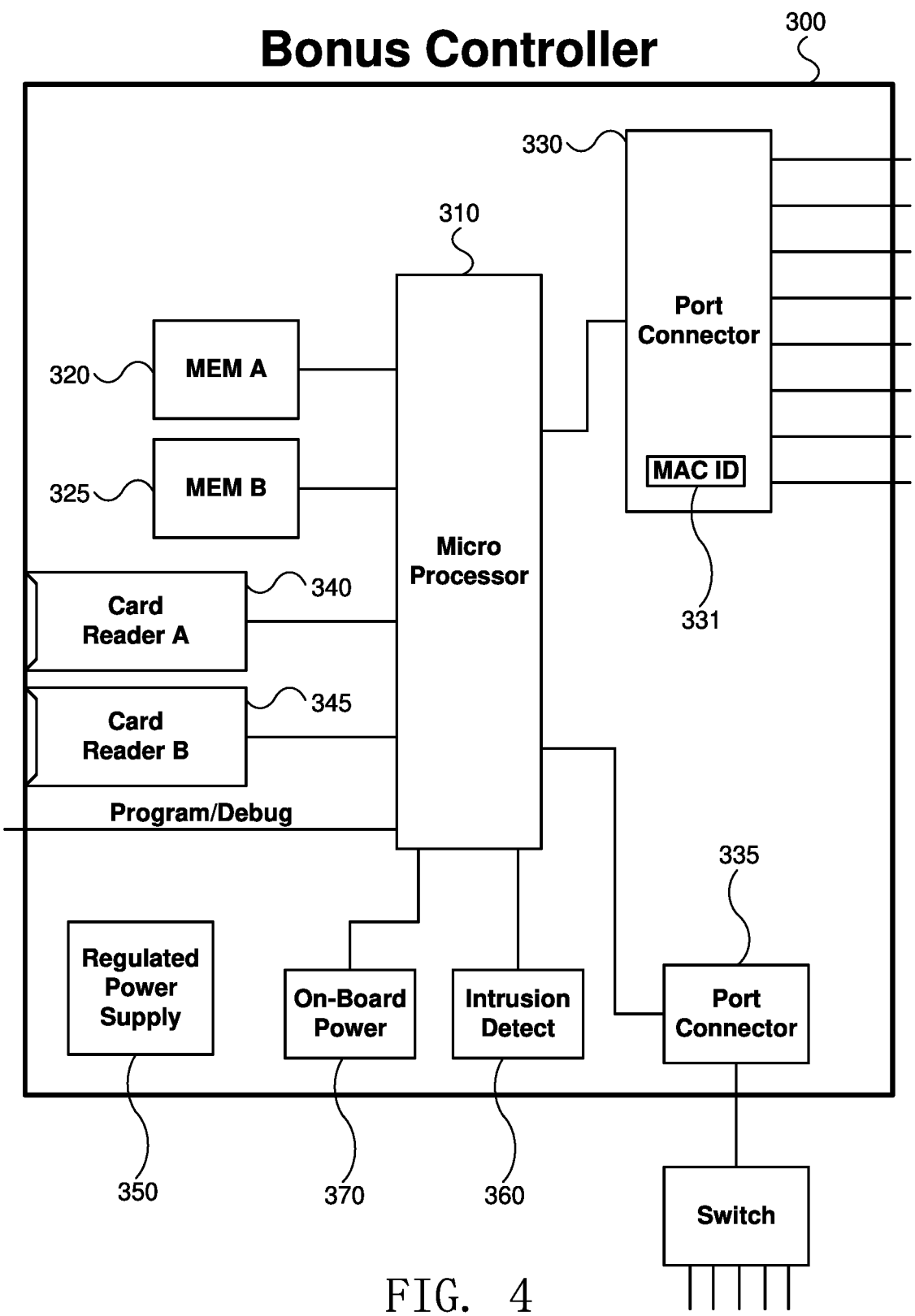
FIG. 4 is a block diagram of an example bonus controller shown in FIG. 1 according to embodiments of the invention.

With reference back to FIG. 1, recall that the bonus controller 40 couples to each of the MIDs 200, and by extension to their coupled EGDs, such as EGMs 10, and possibly to one or more EGMs themselves, to cause data and commands to be sent to the EGMs to control functions on each EGM. FIG. 4 is a detailed block diagram of such a bonus controller, according to embodiments of the invention.

A bonus controller 300 of FIG. 4 may be an embodiment of the bonus controller 40 illustrated in FIG. 1. Central to the bonus controller 300 is a microprocessor 310, which may be an Atmel AT91SAM9G20, which is readily available to developers.

The microprocessor 310 is coupled to one or more memory systems 320, 325. A memory system 320 is a 2 Megabyte FRAM while memory system 325 is a 64 Megabyte Synchronous DRAM (SDRAM). Each memory system 320, 325 has various advantages and properties and is chosen for those properties. FRAM maintains its data autonomously for up to ten years, while SDRAM is relatively fast to move data into and out of, as well as being relatively inexpensive. Of course, the sizes and types of memory included in any bonus controller according to embodiments of the invention may be determined by the particular implementation.

The microprocessor 310 also couples to a pair of card readers, 340, 345, which are structured to accept easily replaceable, portable memory cards, as are widely known. Each card reader may further include Electro-Static Discharge (ESD) devices to prevent damage to internal circuitry, such as the microprocessor 310, when cards are inserted or removed from the card readers 340, 345. In practice, a card in one of the card readers 340, 345 may store program code for the microprocessor 310 while a card in the other reader may store data for use by the bonus controller 300. Alternatively a single card in either of the card readers 340, 345 may store both program and data information.

A port connector 330 includes multiple communication ports for communicating with other devices. With reference back to FIG. 3A, the communication processor of each MID 200 couples to a connected bonus controller through such a communication port. The communication port 330 is preferably an Ethernet interface, as described above, and therefore additionally includes a MAC address 331. The port connector 330 includes multiple separate connectors, such as eight, each of which connect to a single MID 20 (FIG. 1), which in turn connects to up to eight separate EGMs 10. Thus, a single bonus controller 300 may couple to sixty-four separate EGMs by connecting through appropriately connected MIDs.

Further, a second port connector 335 may be included in the bonus controller 300. The second port connector may also be an Ethernet connector. The purpose of the second port connector 335 is to allow additionally connectivity to the bonus controller 300. In most embodiments the second port connector 335 may couple to another bonus controller 300 or to other server devices, such as the server 60 on the gaming network 50 of FIG. 1. In practice, the second port connector335 may additionally be coupled to a MID 20, thus providing the bonus controller 300 with the ability to directly connect to nine MIDs 20.

Yet further, Ethernet connections are easily replicated with a switch, external to the bonus controller 300 itself, which may be used to greatly expand the number of devices to which the bonus controller 300 may connect.

Because the bonus controller 300 is intended to be present on a gaming network 50, and may be exposed to the general public, systems to protect the integrity of the bonus controller 300 are included. An intrusion detection circuit 360 signals the processor 310 if a cabinet or housing that contains the bonus controller 300 is breached, even if no power is supplied to the bonus controller 300. The intrusion detection circuit may include a magnetic switch that closes (or opens) when a breach occurs. The microprocessor 310 then generates a signal that may be detected on the gaming network 50 indicating that such a breach occurred, so that an appropriate response may be made. An on-board power circuit 370 may provide power to the bonus controller 300 for a relatively long time, such as a day or more, so that any data generated by the processor 310 is preserved and so that the processor 310 may continue to function, even when no external power is applied. The on-board power circuit 370 may include an energy-storing material such as a battery or a large and/or efficient capacitor.

Similar to the microprocessor processor 260 of the SAS processor 210 described above, the microprocessor 310 of the bonus controller 300 is additionally coupled to a program/debug port for initially programming the microprocessor 310 during production, and so that program and/or other data for the microprocessor may be updated through the program/debug port.

In operation the bonus controller 300 configures and controls bonus features on gaming devices through a gaming network 50 or through other communication systems. Bonus features are implemented through each gaming device's internal structure and capabilities, and may include integration with additional peripheral devices. Bonusing programs for the connected games may be introduced to the bonus controller 300 by updating data stored in the memory systems directly on the bonus controller, or by inserting new memory cards in one or more of the card readers 340, 345. Such a platform provides a facility for game developers, even third-party developers, to define and program new types of bonus games that may be used in conjunction with existing EGMs on existing gaming networks, or on new games and new networks as they are developed.

One concept that can be implemented on newly manufactured gaming devices, or implemented utilizing the bonus controller and/or MID discussed above to modify existing gaming devices, is a game that combines an entertainment game with a gambling game. As used herein, an entertainment game or entertainment-based game refers to a game that is played without the direct possibility of winning an award based on the game's outcome. These entertainment games may include games that require player skill, which may include physical and/or mental skill to optimize game results. Entertainment games may also include games that are traditionally played as games of chance, but are not tied to specific prizes for achieved game outcomes. Entertainment games may have scores associated with them, where the scores are based on the play of the games. Various prizes or promotions may be awarded to a player upon the accumulation of a predefined number of points in a score, for playing a certain number of entertainment-based games, playing the entertainment-based game for a predefined period of time, or other measureable metric. However, prizes are not directly awarded for specific game outcomes for entertainment-based games. On the other hand, gambling games or wager-based games as used herein refer to games of chance that have specific prizes associated with predefined game outcomes. These include common games of chance, such as slot games, poker, blackjack, keno, pai gow, craps, etc.

As discussed above, gaming establishments such as casinos need to have gaming devices that payback, on average, less than 100% of the wagers placed to secure a profit. This typically requires gaming devices that have large awards to payout these awards relatively infrequently. However, casinos also want to provide entertainment to their players so that they do not get bored while playing the gaming devices or do not leave if they receive a string of losing game outcomes. Providing entertaining games that require a lot of player interaction is one way to keep players involved in and interested in gaming sessions. One way to accomplish this without resorting to repetitive random selections or button pushes is to make the player interactions a factor in the amount or type of game outcome. In other words, the player's actins have a measureable effect on the game's outcome. Gaming regulations, however, typically frown upon games that rely too much on player skill because of the unequal paybacks that players with different skill levels would receive for the same wager. Some games have been created that mimic the feel of well-known skill based games to draw players. However, these games often do not prove to be successful because the elements that made them popular have been removed to make them pay less than 100% and/or to not rely heavily on player skill. Embodiments of this concept solve this issue by providing a game that utilizes a combination of an entertainment game and a gambling game. More specifically, embodiments of this invention provide an entertainment game that retains the playability and fun of a skill game or other non-traditional gambling game while allowing for wagers to still be placed and awards won. In some embodiments, the wager-based gambling game is tied directly into the entertainment game, which provides additional entertainment and excitement. Other embodiments separate some of the aspects of the gambling game from the entertainment game to retain the feel of well known gaming devices while still providing an entertainment game to the player.

In some embodiments, games may have multiple entertainment games available. Here, the player may select which of the available entertainment games they wish to play. The wager-based portion of these games may be virtually identical or may differ in theme or play. For example, if a gaming device has multiple entertainment games and a separate wager-based game (e.g., the embodiment illustrated in FIG. 7) of three mechanical spinning reels, the wager-based game portion of the gaming device may remain the same regardless of which entertainment game is selected. In other embodiments, the wager-based game may be influenced by the entertainment game (e.g., the embodiment illustrated in FIGS. 6A-6D), and hence may differ depending on the selected entertainment game. In yet other embodiments where each gaming device includes only a single combination of an entertainment and a gambling game, games with separate entertainment games or themes may share at least some common design elements, especially regarding wager selections and help interfaces. Similarly, some embodiments have multiple wager-based games available. In these embodiments, the player may select which of the wager-based games they would like to play. This selection may be made in conjunction with or independently of a selection of an entertainment-based game to play.

These games may be directly implemented in a gaming device 10, 12 (FIG. 1) using the gaming device's processor 120 (FIG. 2) and/or memory 110. These games may also be downloaded to a gaming device 10, 12 (FIG. 1) from a remote server 60, such as in a server-based gaming environment. Alternatively, the combination of the entertainment game and gambling game may be stored in the memory of a bonus controller 40 (FIG. 1) connected to a gaming device 10. This may allow casino personnel or even a player to select an entertainment game to be played on the gaming device 10. In other embodiments, game play may occur over the Internet 70 where a personal computer 72 acts as the gaming device by which the player plays the game. Here again, the player may be able to select among several entertainment game themes to play.

Figure 5:
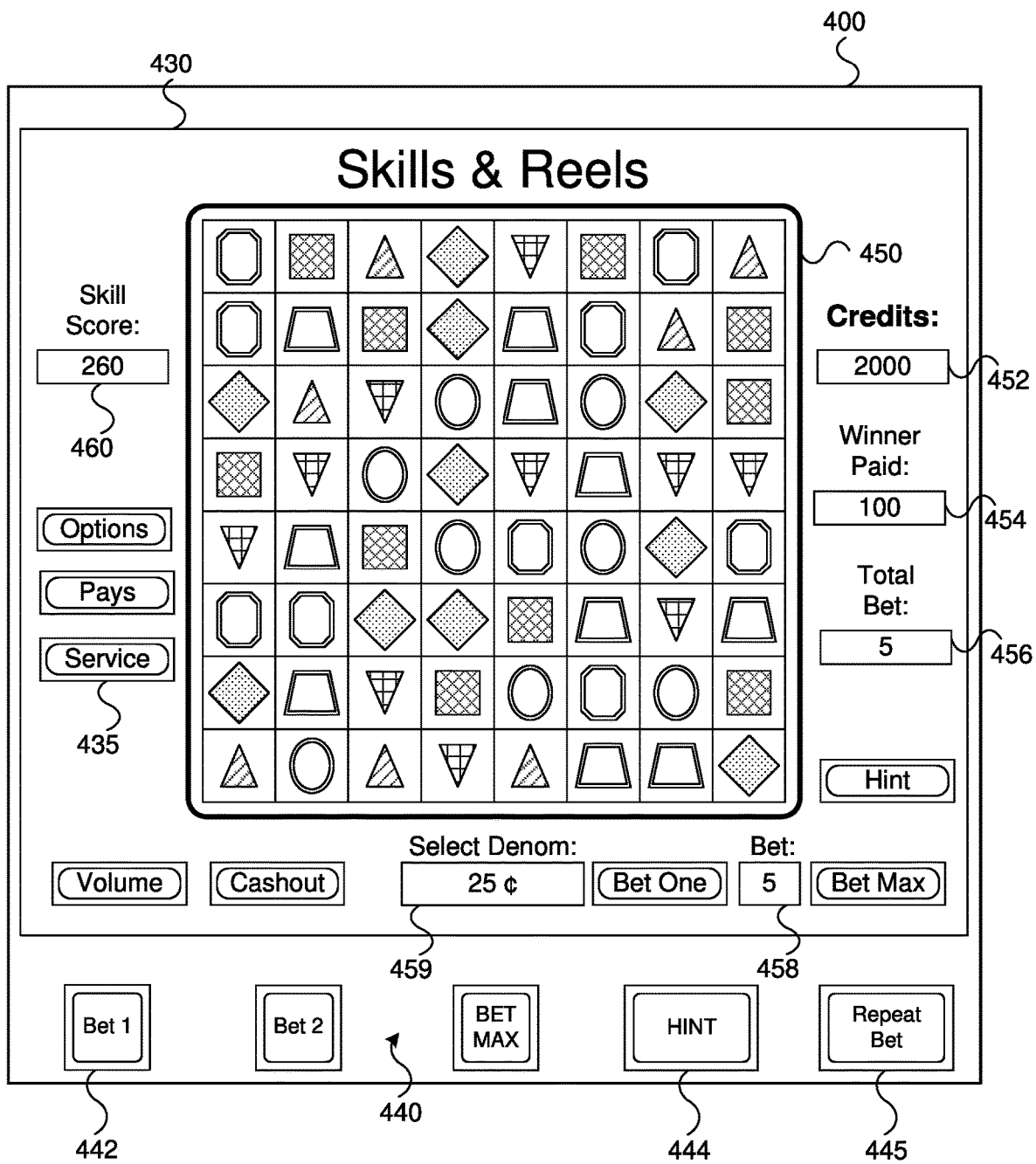
FIG. 5 is a detail diagram of an example gaming device configured to allow play of an entertainment-based game according to embodiments of the invention.

FIG. 5 is a detail diagram of an example gaming device configured to allow play of an entertainment-based game according to embodiments of the invention.

Referring to FIG. 5, a gaming device 400 includes a video display 430 and a player interface panel 440. The player interface panel 440 may include one or more game buttons 442 such as buttons that provide for specific wagers, a hint or help button 444 that provides instructions on game play, and a "Spin" or "Repeat Bet" button 445 that triggers game play. The video display 430 includes an entertainment-based game display portion 450, a plurality of soft buttons 435 to aid in game play, a credit meter 452, a paid meter 454, a total bet meter 456, a bet meter 458, a denomination display 459, and a score meter 460. Here, the entertainment game displayed on the entertainment-based game display portion 450 is a grid of jewel symbols that may be similar to the well-known game Bejeweled®. Bejeweled® is a popular video game often played on-line that occupies a category called "match-3." This jewel matching entertainment game is played on an 8×8 grid, filled with 7 different kinds of jewels. Players attempt to line up three or more jewels of the same type in horizontal or vertical rows by swapping adjacent jewel positions. Some versions of the game only allow moves that cause an alignment of three or more jewels are allowed and points are awarded for each such accomplishment. Other versions allow other symbol swaps that do not necessarily result in a horizontal or vertical match of three symbols. Once three or more similar jewels are matched, the aligned jewels disappear and all of the jewels above those that disappeared fall down to fill the void. New randomly selected jewel symbols fall in from the very top so that a grid of 8×8 symbols is maintained.

In the illustrated embodiment, the game may be implemented on a video touch screen, so that the player simply has to touch one of the symbols to move it. The player may simply push a selected symbol in a desired direction, or may select a second symbol with which to switch positions. If a match of 3 or more symbols will result, the exchange is executed. If a match does not result, the exchange may either be allowed without an associated gambling game or may be rejected depending upon the configuration of the gaming device 400. When a three or more symbol match or alignment occurs, points are awarded. More points are earned for aligning 4 or 5 symbols than for 3. Any symbols above fall down for as many spaces as were cleared by the alignment. New symbols are added from the top to keep the game board fully populated. In some embodiments, these new symbols are chosen completely at random. In other embodiments, the new symbols may be selected based on certain game conditions. For example, if no other matching opportunities remain on the symbol grid 450 (that is, player moves that will result in a match of three or more symbols), certain symbols may be selected as the new symbols to ensure that such a matching opportunity is available in the next entertainment game.

Sometimes a new alignment is created as replacement symbols fall into place. Additional points are awarded each time this happens. Those aligned symbols also disappear and are replaced with new symbols from above, which may trigger even more alignments. This cascading of alignments rapidly increases scoring and creates much of the game's excitement (referred to as "cascades"). Advanced players may seek moves that will trigger additional alignments, giving them much higher final scores than players who do not seek such opportunities.

The goal is to achieve the highest score possible and many levels of play are involved. The game is really about pattern recognition and includes skill and strategy in determining which alignments to make. Higher scores are accomplished by achieving cascades of alignments that lead to other alignments when they disappear. Multiple match cascades can even occur after a player aligns a single set of jewels without evidence of another match occurring from the new symbols appearing above the match. Thus very high scoring rounds may occur unexpectedly at any time.

The entertainment-based game of the gaming device 400 retains this known playability of the jewel-matching game instead of trying to modify the rules of play in an attempt to shoe-horn a popular game theme into a wager-based format. The wager-based gambling portion of the gaming device allows the player to enjoy the excitement of playing the jewel matching game while still allowing them to place wagers on gambling events, as described below.

In the gambling or wager-based game, each of the matched jeweled symbols is replaced by a spinning reel. These reels are spun and a game outcome is shown. If a winning combination of symbols appears on the reels, prizes are awarded to the player. For example, if three jewel symbols are matched, three spinning reels replace the matched jewel symbols and are spun to show a game outcome. If 4 or 5 symbols were matched, the slot game invokes 4 or 5 spinning reels. In other embodiments, more or less symbols may be matches to generate spinning reels or another type of wager-based game. After the reels stop spinning, and regardless of win or loss, the reels then disappear from the playfield and new symbols drop into place.

In some embodiments, players can only move the jewel symbols to create a match of at least three jewels. As long as the new symbols that replace the matched jewels allow for the possibility of another match in the symbol grid 450 there is no issue in providing at least one move for the player to make. When such a possibility for a match would not be possible given the new replacement symbols, the game may either alter the new replacement symbols to ensure that a match is possible, if the new symbols are chosen randomly, or provide the ability to reset a portion of or the entire grid 450 so that a match move is possible. In essence, these embodiments are simply replacing the slot machine's Spin button with the entertainment-based matching game because a match will definitely take place, meaning that a game of chance will definitely be played. That is, players choose the number of credits to wager and begin playing the jewel-matching game. Each time they align a set of jewel symbols, they earn points in the entertainment game similarly to how they would be awarded in a stand-alone version of the entertainment game. However, right before the matched symbols disappear, each symbol is translated into a spinning reel, as illustrated in FIGS. 6A-6D. All reels stop after about relatively short time (e.g., 1 second) just like a normal slot machine. If a winning combination is achieved, the player is paid an appropriate award, and game play continues. Here, the actual wager may be deducted from the credit meter at the beginning of the entertainment game or when the reels are spun in the wager-based game without any change game play as long as multiple cascades do not result in multiple wagers being placed.

In other embodiments, a player's move may not have to result in a match of three or more symbols. In these embodiments, the player may choose to forgo a move that provides for an immediate three symbol match to position herself for a future five symbol match or cascade of matches. These embodiments allow for more player strategy, but have to compensate for the lack of a guaranteed wager-based game by implementing a proper credit wagering system. In some of the embodiments the wagered credits are deducted regardless of whether the player's move results in a match. Here, the tradeoff is that the player may forgo the chance of win to make a more favorable match in the future. Thus, it may take the player two or three wagers to create the match that they want. However, this match may provide for a better award possibility. In other embodiments, the wagered credits are only deducted when the wager-based game is played (i.e., the reels are spun). Here, the player may not be able to make a match rendering move, but won't have to wager unless the reels are spun. These embodiments may, however, deduct a wager for each time the reels are spun so that the player does not use previous turns to build up a large cascade of symbols and then only have to place one wager to trigger the cascade. Additionally, matches of four or five symbols may require a larger wager if the prizes associated with wins having four or five spinning reels is larger than the possible wins with three spinning reels. Alternately, matches of more than three symbols may use different paytables.

In either type of embodiment, the player is essentially playing an entertainment game while she is gambling. As shown in FIG. 5, the player has a score meter 460 on the left of the symbol grid 450 to keep track of the score the player achieves in the entertainment-based game. On the right of the entertainment-based game playfield 450 is the credit meter 452, credits won meter 454, and total bet meter 456, all relating to the wager-based game portion of the game.

As described above, if a cascade occurs, the player could either be charged their wager value for each cascade element, the additional cascades could be "free spins" in a bonus game, or a combination of a fee-based and free spin method may be used such as charging for only the first extra spin or charging a fee that is different from the wager amount. The "free spin" configuration may be preferable because it might be perceived as unfair to charge players credits out of their control and also because they might run out of credits. In some embodiments, the free play costs are controlled by separate math for the free play games, which may be different than that of the spins resulting directly from the initial symbol match. In this way the gambling odds may be set and maintained completely independently of the entertainment-based game.

In some embodiments, high scores could be kept for one or both of the entertainment-based game and gambling game. Of course, players achieving a high score might not do well on the slot side and vice versa. In another embodiment, the outcome of entertainment game could influence the slot pays, high scores, level achievements, or simply matching certain digits in the score to preselected values could increase the chance of a winning outcome or increase the award value of a winning outcome. The score could also be used as a trigger for a progressive jackpot award, which could be a standalone jackpot available only on that machine or a linked award available on many machines.

FIGS. 6A, 6B, 6C, and 6D are detail diagrams showing an example game sequence on the gaming device illustrated in FIG. 5.

Figure 6A:
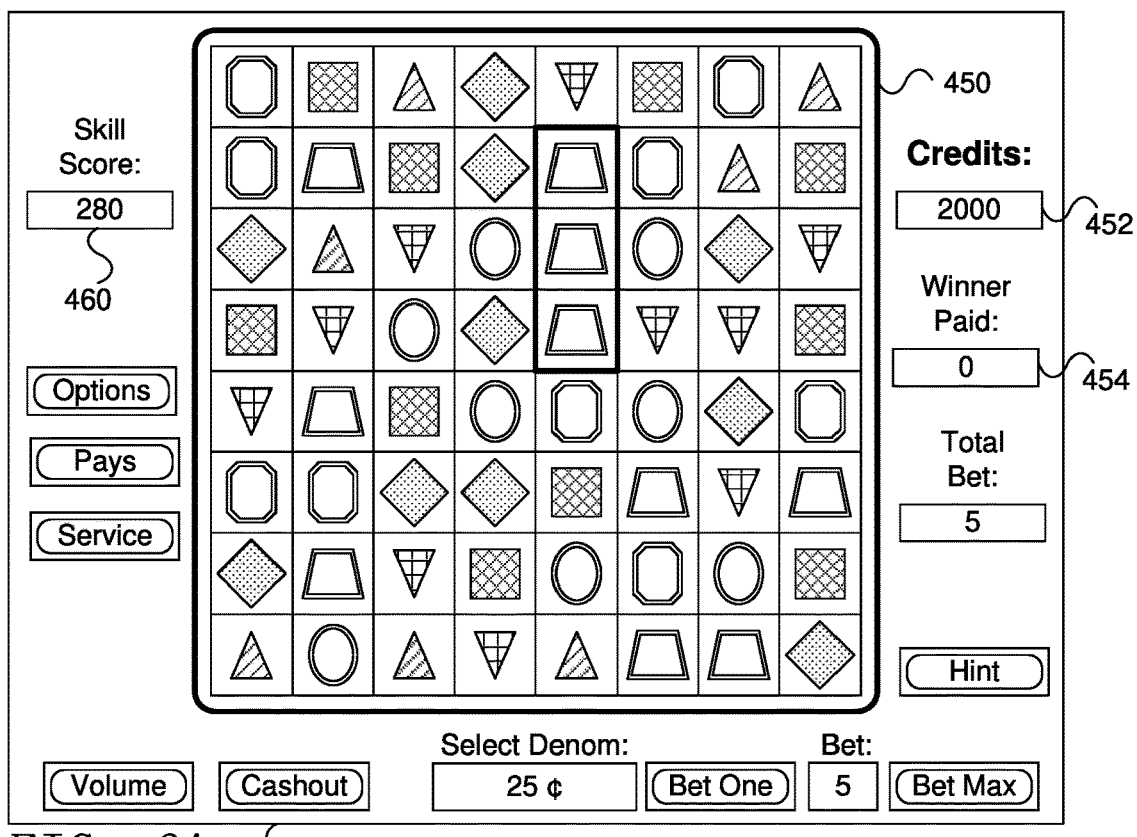
FIGS. 6A, 6B, 6C, and 6D are detail diagrams showing an example game sequence on the gaming device illustrated in FIG. 5.

Referring to FIG. 6A, game play of the gaming device 400 begins with the entertainment-based game display portion 450 shown in FIG. 5. The player initiates a game by wagering five credits at 25 cents per credit for a total wager of $1.25. The player notices that she can create an alignment of three vertical trapezoid shaped jewels in the $5^{th}$ column (row positions 2-4) by switching the jewel in the $4^{th}$ row position with the adjacent trapezoid jewel symbol. After the switch is made, the match of the three trapezoid symbols is highlighted as shown on the gaming display 430A. The score meter 460 is incremented by a match-three score of 20 points resulting in a total of 280 points. The credit meter 452 still shows that the wager has not been deducted from the total available credits. As mentioned above, in other embodiments, credits may be deducted at the beginning of the entertainment-based game. The matched jewels are then replaced by spinning reels each having a single reel position, which are spun and then come to a rest as shown in FIG. 6B.

Figure 6B:
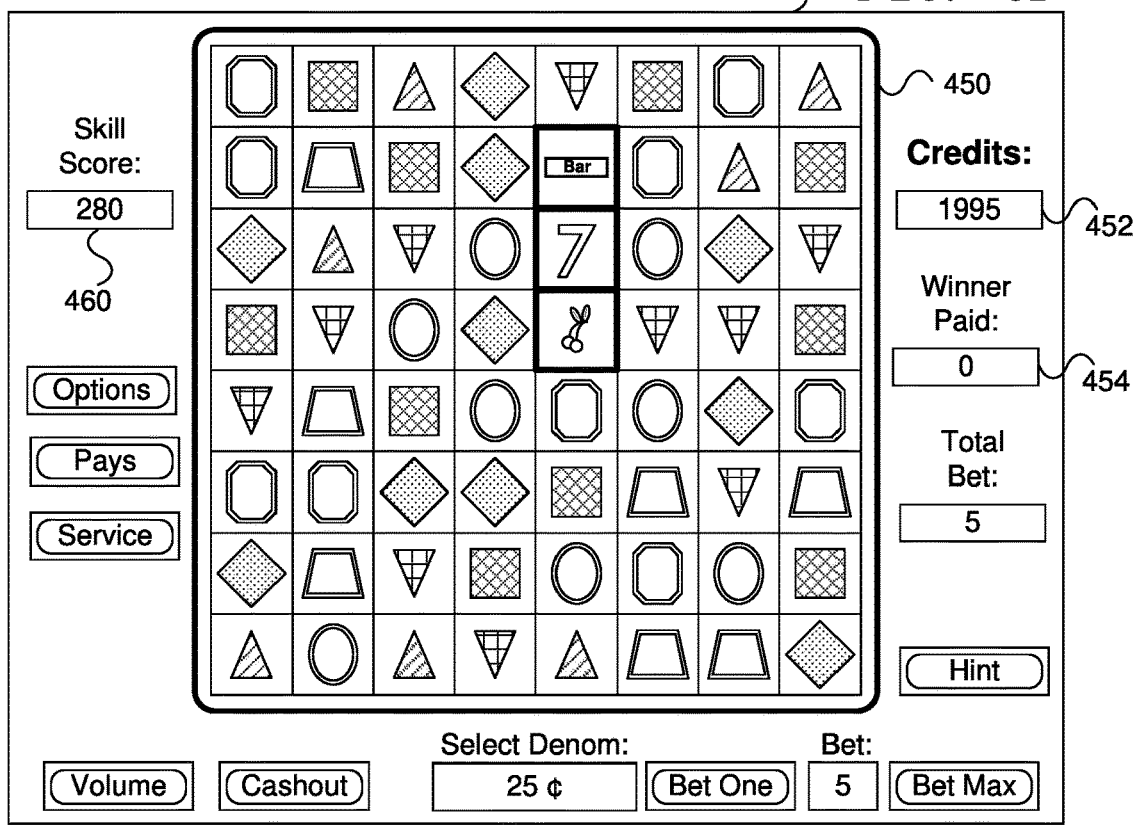

Referring to FIG. 6B, the gaming display 430B reflects that the spinning reels have come to rest showing that the player has received three non-matching gaming symbols. Here, the credit meter 452 shows that five credits wagered have been deducted from the total credits available and that no credits have been won. At this time, the reels disappear and new jewel symbols above the disappearing symbols fall into place where the previously matched symbols were located. New randomly selected jewel symbols fall in from the top of the symbol grid to complete the symbol grid 450. At this point, if no more symbol matches were made, the game would end and the player would have lost their five credit wager. However, as shown by FIG. 6C, as the symbols from above fell into place, another alignment of three similar jewel symbols was achieved.

Figure 6C:
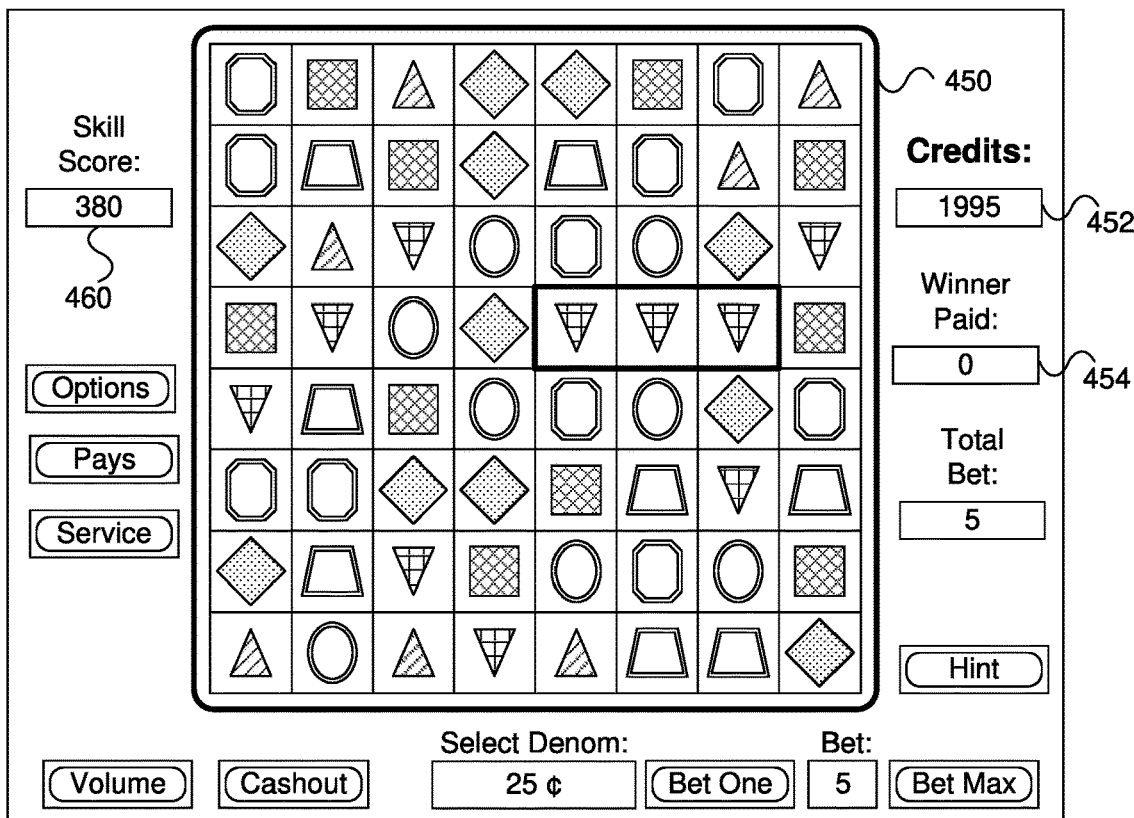

Referring to FIG. 6C, the gaming display 430C shows that three inverted-triangle jewels are matched in row 4. This in an example of a cascade described above and allows the player another chance at winning an award as well as receiving more points. As reflected in the score meter 460, this second cascade match is worth 100 points. As before these matched jewel symbols are replaced by spinning reels, as shown in FIG. 6D.

Figure 6D:
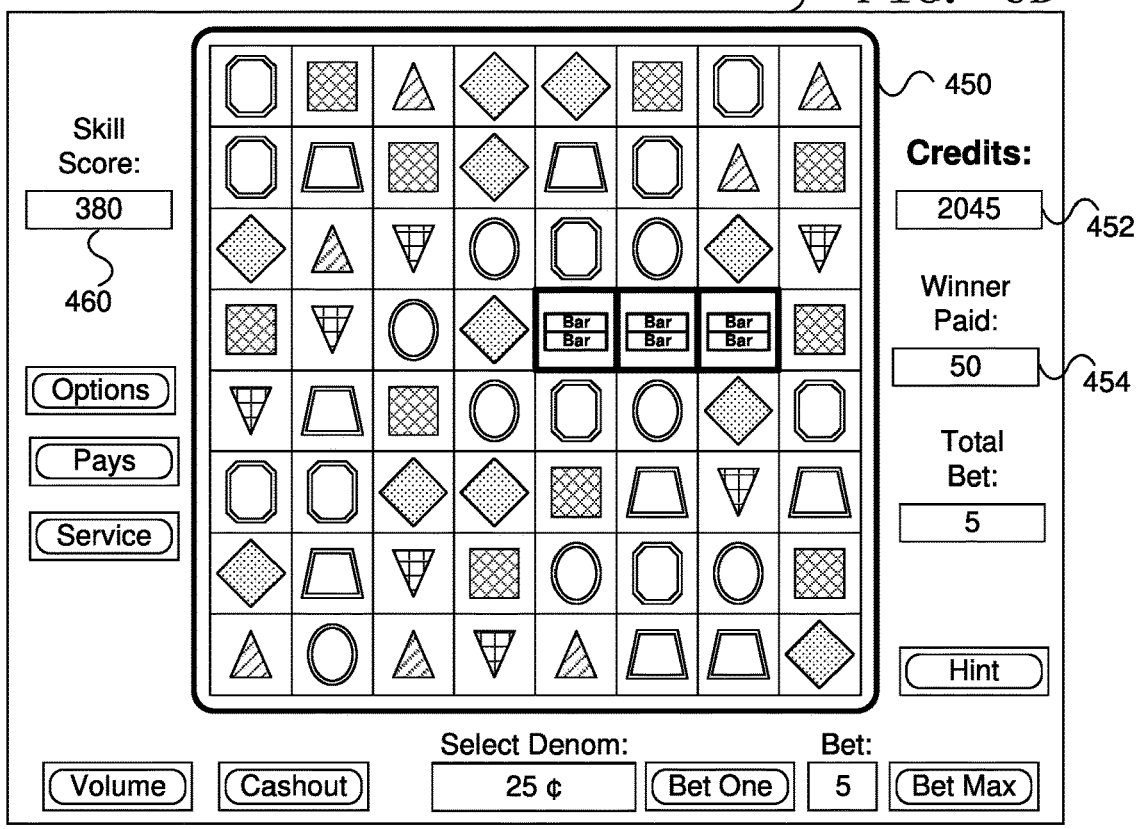

Referring to FIG. 6D, the gaming display 430D reflects that the spinning reels have come to rest showing that the player has received three double-bars symbols. Here, the credits-won meter 454 shows that 50 credits have been awarded as a result of the double bars. The credit meter 452 shows that no additional credits were wagered for the second reel spins and that the 50 credits won for the double bars has been added to the total credits available. As discussed above, in other embodiments, another wager of five credits may have been deducted for this second reel spinning game.

Of course, jewels are simply symbols and lots of alternative games using the same "match-3" rules are available. In addition, although an 8×8 symbol grid is depicted in these embodiments, grids of all shapes, sizes, and types may be used in other embodiments. These matching games are also merely one type of entertainment game and many others are possible. Tetris, word games such as Scrabble® or Boggle®, crossword puzzle style games, Sudoku® style games, card games, and other such games could all be used as entertainment-based games. Additionally, traditional wager-based games may be used as entertainment games. For example, a video poker game may be used as the entertainment-based game, where points are won for some or all of the resulting hands. After these points have been awarded, some or all of the five cards in the poker hand may be transformed into reels for the wager-based game. In a linked-game embodiment, players may compete against each other in an entertainment-based poker game with points awarded, and have separate (or linked) wager-based games that take place during or after the linked poker game.

Although spinning reels are shown as the wager-based game, many different types of wager-based games may be used in other embodiments. For example, a playing card may be displayed for each matched symbol as part of a video poker, blackjack, pai gow poker, or other card game. In one embodiment, the matched 3, 4, 5, etc. symbols may be replaced with cards that are collected and have their value added using a blackjack card point system. Here, scores of 25 points or less win nothing, scores of 26-28 earns 5× the player's bet, scores of 29-30 earn 8× the player's bet, scores of 31-33 earn 10× the player's bet, scores of 34-36 earn 15× the player's bet, scores of 37-42 earn 50× the player's bet, scores of 43-48 earn 100× the player's bet, scores of 49-53 earn 250× the player's bet, and a score of 54 earns 10,000× the player's bet.

Figure 7:
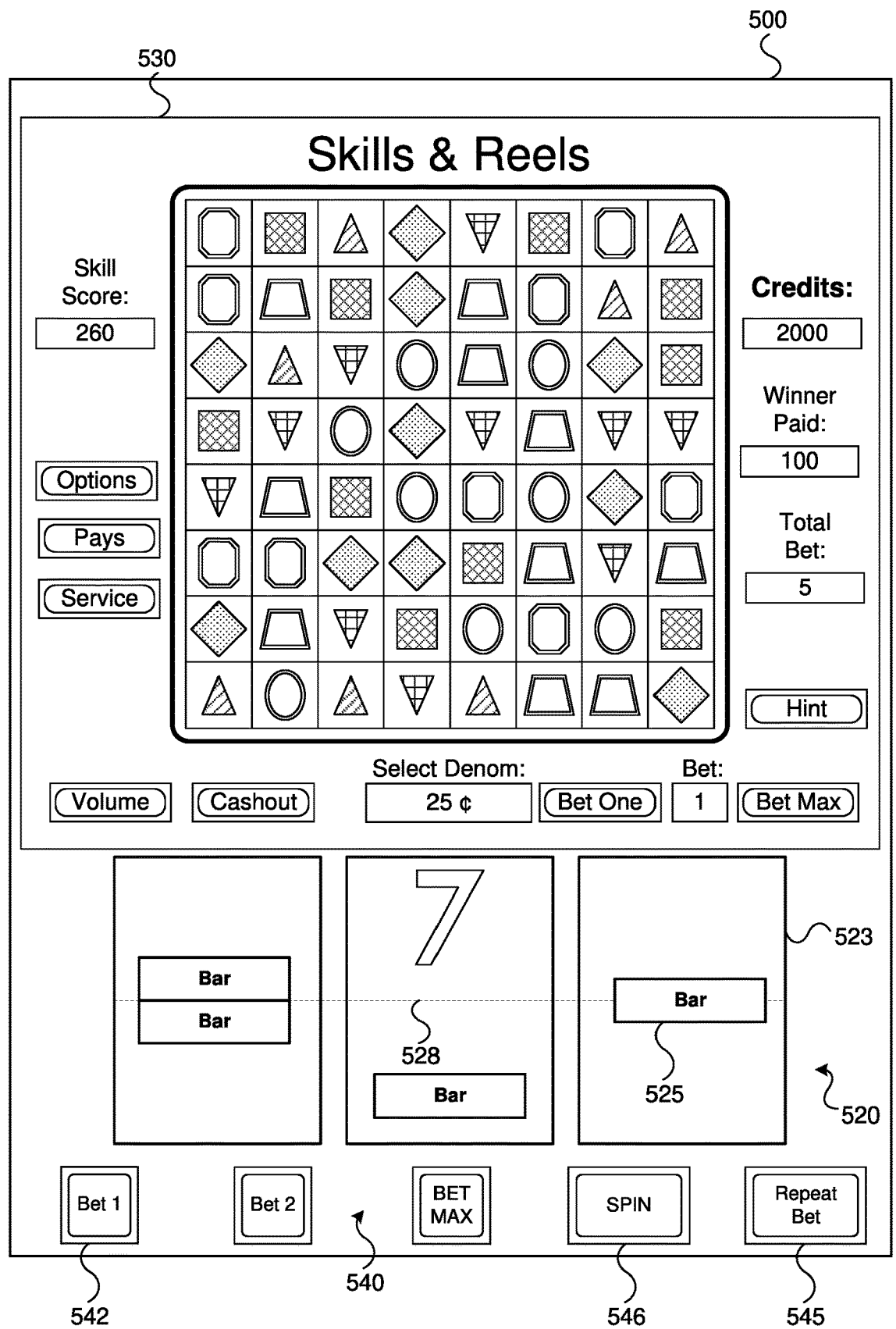
FIG. 7 is a detail diagram of another example gaming device configured to allow play of an entertainment-based game according to embodiments of the invention.

FIG. 7 is a detail diagram of another example gaming device configured to allow play of an entertainment-based game according to embodiments of the invention. More specifically, FIG. 7 illustrates a gaming device 500 that includes a wager-based game display portion 520 that is separate from a game display 530 used for displaying an entertainment-based game. As mentioned above, this configuration allows for the separation of the entertainment-based game and the wager-based game, which may be preferable in certain game configurations. For example, in a word-based trivia entertainment game, the use of a separate wager-based game display 520 may allow multiple reels 523 to be spun after a correct response without tying an aspect of the answer to part of the wager-based game display.

Although FIG. 7 illustrates three mechanical spinning reels 523 having multiple game symbols 525 on associated reel strips in the wager-based game display portion 520, any type of wager-based game display may be used. For example, in some embodiments, the same video display used for the entertainment-based game may also have a separate portion used to display video reels for a wager-based game. In other embodiments, a video display used to show the entertainment-based game may replace some or all of the entertainment game display with a separate wager-based game display, such as in a second screen display configuration. In these embodiments, the screens may alter between the entertainment-based game and the wager-based game. The exact configuration of the display portions of the gaming device 500 may be determined based on the type or style of entertainment game, the type or style of the associated wagering game desired, the available game hardware, the target player group, etc. For example, if the game code for the entertainment-based game was loaded and stored in a bonus controller 40 (FIG. 1) connected to an existing gaming device 10 with a single video display through an MID 20, the entertainment-based game may be configured to alter display screens between the entertainment game display and the wagering game display, if such a separate display of the games is desired. In another example, if the gaming device was embodied in a personal computer 72 (FIG. 1), where the player was playing the game over the Internet 70, separate portions of the computer display screen may be used to show the entertainment-based game and the wager-based game.

As mentioned above, slot-type spinning reels are not the only type of wager-based game that may be used. In embodiments where matched symbols in the entertainment-based game are replaced by cards, the wager-based game display portion 520 may be used to hold a five card poker hand. Here, when the player matches three symbols, for instance, the three cards that replace the matched symbols are transferred down to the five card poker hand displayed in the wager-based game display portion 520, where the three cards replace three of the displayed cards and the hand is analyzed to see if it is a winning hand. The following example shows how one particular embodiment would be configured. Here, the cards initially displayed in the wager-based game display portion 520 are: 5S 4D JC 9H AH (S=spade, H=heart, D=diamond, and C=club). In the next entertainment game (Game 1), the player matches three symbols. In the following game (Game 2), the player matches 4 symbols and then 3 symbols on the shifted symbol matrix. On the next game (Game 3), the player again matches 3 symbols. Table 1 below illustrates how the poker hands would look during each of the games and if any prizes were awarded to the player.

TABLE 1

| Game # | Card 1 | Card 2 | Card 3 | Card 4 | Card 5 | Award |
|---|---|---|---|---|---|---|
| Initial | 5 S | 4 D | Jack C | 9 H | Ace H | N/A |
| 1 | 10 S | Queen C | King C | 5 S | 4 D | 0 |
| 2 | Ace D | 2 H | Ace S | 7 H | 10 S | 2 |
| 2 cont. | 2 D | 2 S | 6 S | Ace D | 2 H | 3 |
| 3 | Jack H | Queen D | 9 D | 2 D | 2 S | 0 |

Here, during the first game, the player matched three jewel symbols, which were replaced by the 10 of spades, queen of clubs, and king of clubs. These three cards were put on the left side of the poker hand displayed in the wager-based game display portion 520 which pushed the rightmost three cards out (JC, 9H, AH) and kept the left two most cards (5S and 4D). However, this poker hand did include any winning symbols. Hence, it did not award the player any credits. During the second game, the player matched four jewels, which were replaced by AD, 2H, AS and 7H. These cards were immediately placed down in the poker hand (note that the 10S was kept from the previous hand) and analyzed. Here, the player had a pair of Aces. Since jacks or better paid two times the player's bet, the player was awarded 2× of their wager or two credits on a one credit bet. When the four cards were taken off of the symbol matrix in the entertainment game, the resulting shift in symbols to replace the matched symbols resulted in another match of three jewel symbols. Here, these three symbols of 2D, 2S and 6S were placed in the poker hand, which was again shifted left to right. The poker hand was again analyzed and it was determined that it included a three of a kind in twos. The player was awarded three credits for this three of a kind and second game ends as no more matches on the symbol grid are found. Thus, during the second game, the player was awarded a total of five credits. During the third game, the player matched three symbols that were revealed to be JH, QD, and 9D. There cards were placed in the poker hand, but did not result in a winning hand.

Many other variations of the above game embodiments are possible. For example, in multiple matching games, some embodiments may only analyze the cards from the final match of the game to determine if there is a winning poker hand. Alternately, the player may be able to choose which cards to replace or may be able to alter the order of the cards to effectively control which cards get replaced. This ability to retain specific cards may require an addition side bet wager, may be part of a special bonus awarded to a player that may be used for a predefined number of games, or may be a promotional feature supplied to new players, highly-valued players, or players reaching certain playing thresholds.

Referring back to FIG. 7, the gaming device 500 includes an entertainment-based game display 530 that is separate from a wager-based game display 520. Here, the entertainment-based game display 530 includes a video display similar to the entertainment-based display described above in FIG. 5. During game play, however, instead of matched symbols being replaced with game reels and shown in FIGS. 6A-6D, the mechanical reels 523 would be spun when the player matched three symbols or met some other predefined criterion. Here, prizes are awarded to a player during game play when a predefined combination of game symbols 525 are aligned on the payline 528 after the reels 523 are spun. The player interface panel 540 may again include one or more game buttons 542 such as buttons that provide for specific wagers, a hint or help button 544 that provides instructions on game play, and a "Spin" or "Repeat Bet" button 545 that triggers game play.

Figure 8:
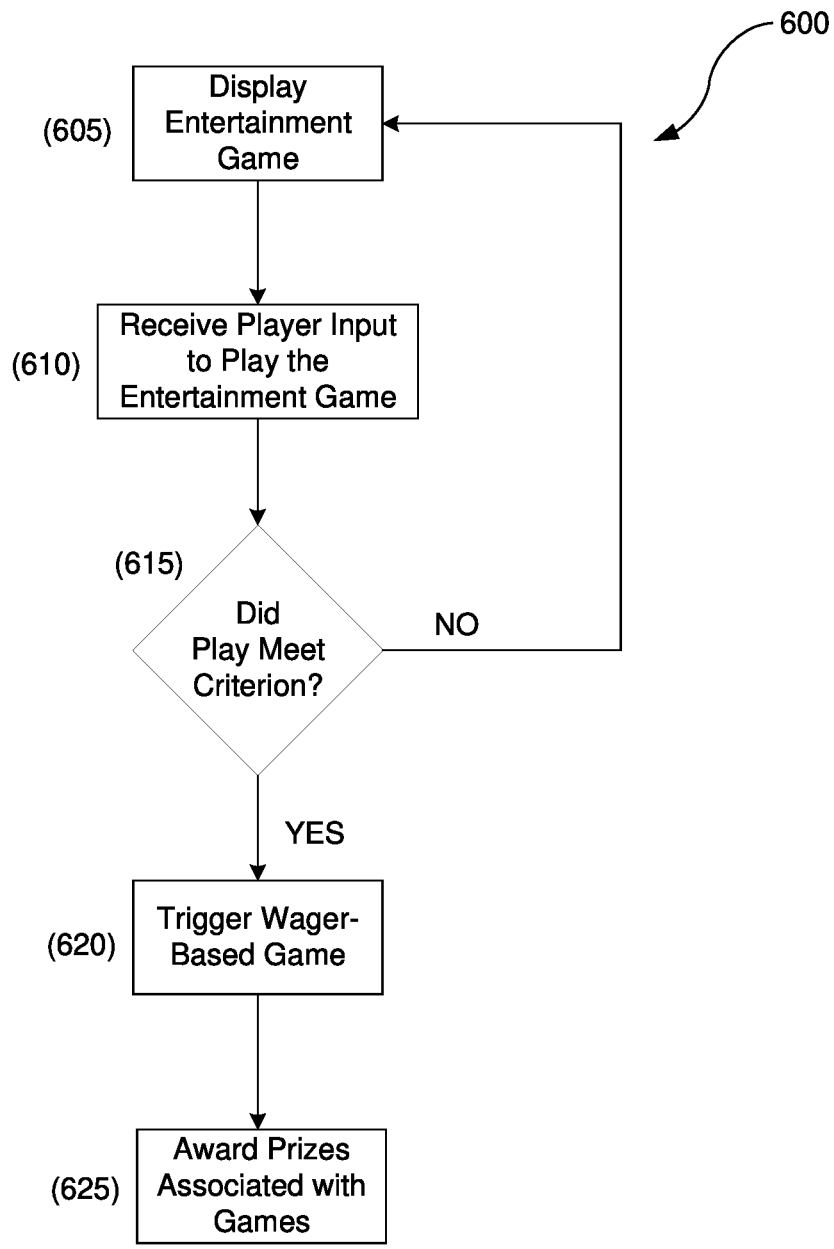
FIG. 8 is a flow diagram of a method of operating a gaming device configured with an entertainment-based game according to embodiments of the invention.

FIG. 8 is a flow diagram of a method of operating a gaming device configured with an entertainment-based game according to embodiments of the invention.

Referring to FIG. 8, flow 600 begins with the display of an entertainment-based game in process 605. In process 610, a player input to play the entertainment-based game is received. This player input may include any input made by the player to advance or alter the entertainment-based game. In the embodiment described above in FIGS. 5, this player input may include the player's selection of a symbol to move, and the adjacent location by which the symbol is to be moved. In other types of entertainment-based game, these player inputs may include the selection of a number, letter, word, card, picture, etc. In some embodiments, process 610 may include receiving multiple player inputs or selections. For example, in a crossword style entertainment game, the player may have to select each letter of a word used to complete a crossword answer block. In some embodiments, process 610 may include awarding points to the player based on the player's input and resulting modification of the entertainment based game. These points may be stored and shown on a separate score meter, such as score meter 460 in FIG. 5.

After a player input is received, process 615 determines if the resulting game play from the player input meets a predefined criterion. In embodiments where the game configuration requires that the player make a selection that furthers game play, process 615 may merely check to see that player has properly made a selection before continuing on with flow 600. For example, if the symbol matching game described in the embodiment illustrated in FIG. 5 only allows the player to make a selection that results in the match of three or more symbols, process 615 may be used to determine that the player input has indeed resulted in the match of three symbols. In other words, the predefined criterion may be that a valid symbol match results from the player input received in process 610.

In other embodiments, process 615 may determine if the player has made a correct selection or a selection that progresses game play. For example, if the symbol matching game described in the embodiment illustrated in FIG. 4 allows the player to make any symbol selection regardless of whether the selection and move results in a match, process 615 may be used to determine if the selection and move results in a match of three or more symbols. Process 615 may also be used to evaluate whether the player input has resulted in a correct selection. In a Sudoku® style entertainment game, for instance, process 615 may determine whether a selected number in a particular grid position is valid. In other words, the predefined criterion may be a validity test.

If process 615 determines that the player input does not meet the predefined criterion, flow 600 returns to process 605 to display the entertainment-based game as modified by the player input. If process 615 determines that the player input meets the predefined criterion flow 600 then proceeds to process 620, where a wager-based game is triggered. The wager-based game may be any of the gambling games discussed above, or any other type of wager-based game of chance. As described above, the wager-based game may be implemented using modified parts of the entertainment-based game or may be separate from the entertainment based game. Prizes associated with the games are then awarded in process 225. Process 225 may include awarding credits or other rewards based on outcome of the wager-based game and may include awarding any prizes or promotions associated with the entertainment based game, as described above.

Figure 9A:
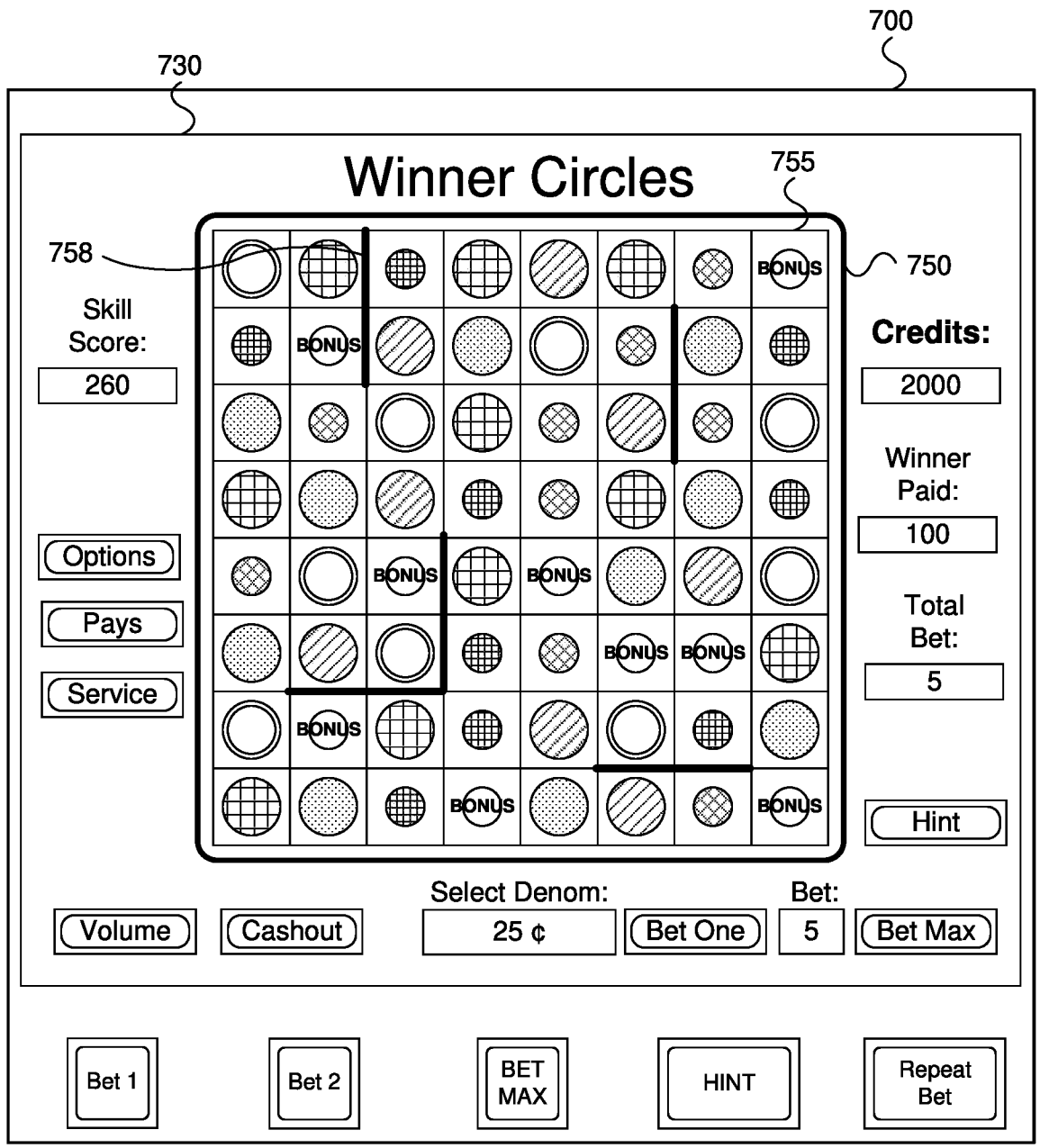
FIGS. 9A and 9B are detail diagrams of another example gaming device configured to allow play of an entertainment-based game according to embodiments of the invention.
Figure 9B:
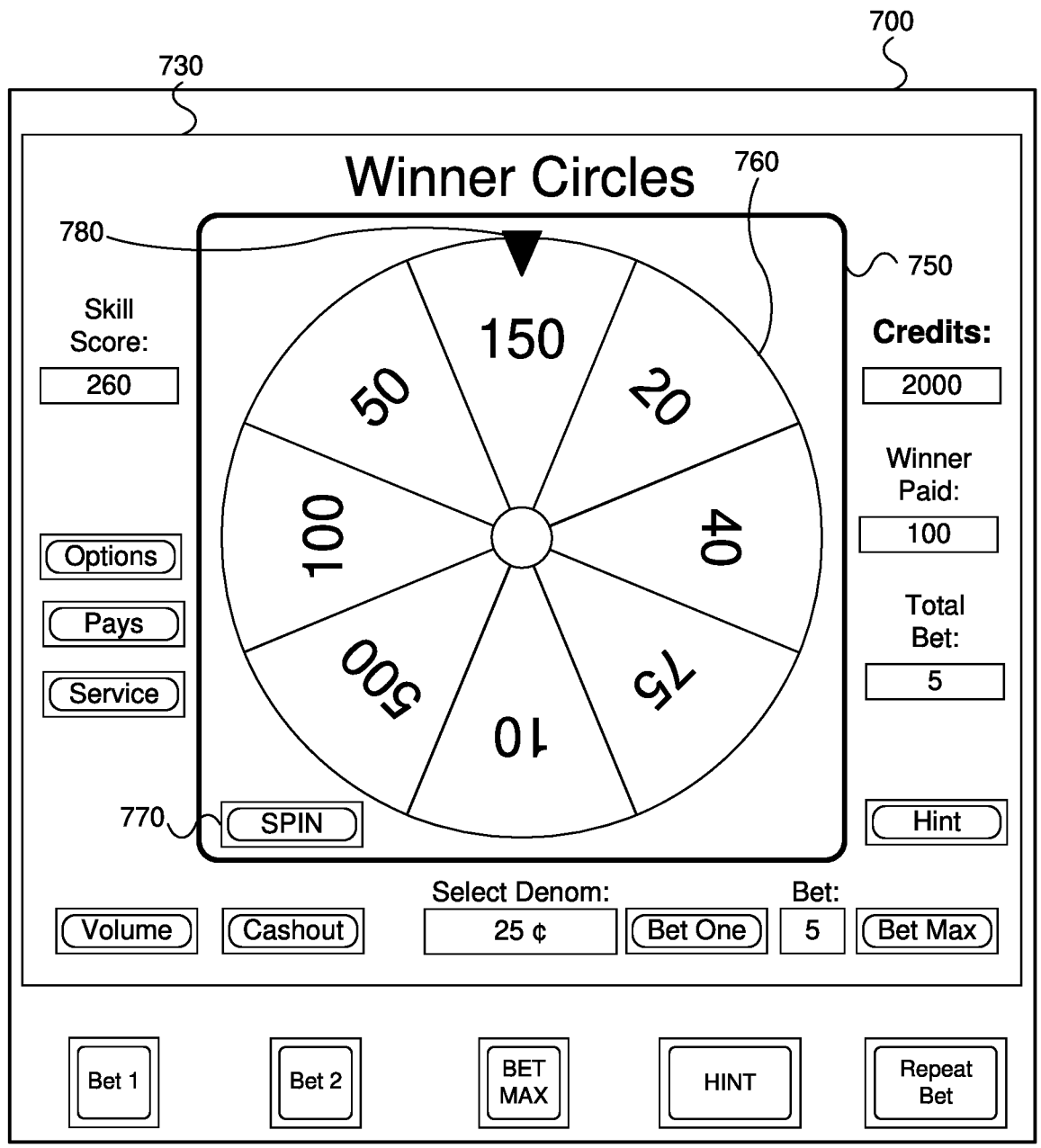

FIGS. 9A and 9B are detail diagrams of another example gaming device configured to allow play of an entertainment-based game according to embodiments of the invention.

Referring to FIG. 9A, a gaming device 700 is configured with an entertainment game similar in some respects to the entertainment game illustrated in the embodiment shown in FIG. 5. That is, the gaming device 700 includes an entertainment game where the goal is to match three or more like symbols in a vertical row or column. Again many alternate possibilities exist as to the form and rules of the entertainment game. In this illustrated embodiment the symbol grid 750 includes bonus symbols 755 and partition walls 758. The partition walls 758 act as barriers that prevent matches from occurring across them. The barrier walls 758 appear from the top of the symbol grid 750 and progress down one row for every entertainment game played. Hence, on a symbol grid with eight rows, a horizontal barrier wall 758 would be on the symbol grid 750 for seven games. Vertical barrier walls 758 may be present even longer since they have multiple vertical portions that pass through the symbol grid 750. In other embodiments, the barrier walls 758 may appear or disappear with each turn either randomly or according to set rules.

The bonus symbols 755 in this embodiment act as a special symbol, which when aligned in a match of three or more triggers a bonus. That is, while matching other symbol alignments may result in a wager game being played as described above, matching the bonus symbols in an alignment results in a separate gaming event that has a guaranteed award. In this embodiment, matching three or more bonus symbols 755 (such as by moving the bonus symbol in the $6^{th}$ column from the $5^{th}$ to $6^{th}$ row) results in the presentation of a bonus wheel over the symbol grid 750 as shown in FIG. 9B.

Referring to FIG. 9B, a bonus wheel 760 appears over the symbol grid 750 that includes multiple portions having a variety of possible bonus values. The bonus wheel 760 includes a spin button 770 to initiate the bonus wheel and a prize indicator 780 that indicates which bonus award is won. Here, the player would press the spin button 770 to initiate the spinning of the bonus wheel 760 and the prize indicator 780 would show which prize was won by the player when the wheel came to a rest.

In other embodiments the bonus wheel may be mechanical or virtual wheel that is separate from the game display 730. Other types of bonuses may be used in different embodiments as well as different types of bonus triggering events. For example, in a Sudoku® entertainment-based game embodiment, a bonus may be initiated when a complete Sudoku® grid is completely filled in. In another embodiment, the bonus wheel may appear for every match of three or more symbols. In these embodiments, different paytables may be used for wheels resulting from matches of three, four, five, etc. symbols. Some of these wheel paytables may include portions that indicate that no credits have been won. In other ones of these embodiments, the use of the barrier walls 758 may make getting matches of three or more symbols much more difficult to ensure that the game retains a payback percent of less than 100%.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A non-transitory computer readable medium that stores a plurality of instructions, which when executed by at least one processor causes the at least one processor to:
    (a) display an entertainment game on at least one video display;
    (b) display a gambling game on the at least one video display;
    (c) initiate play of an instance of the entertainment game responsive to an input from a player;
    (d) automatically trigger a gambling game during play of the instance of the entertainment game responsive to a predefined outcome in the entertainment game;
    (e) deduct a wager from a credit balance prior to running the gambling game;
    (f) thereafter run the gambling game including selecting a random outcome for the gambling game;
    (g) conclude the gambling game, including crediting the player with an award if images of symbols associated with the gambling game correspond to an award in the gambling game;
    (h) return to play of the same instance of the entertainment game after a conclusion of the gambling game; and
    (i) repeat (c) through (h) for the same instance of the entertainment game responsive to additional inputs from the player.

2. The non-transitory computer readable medium of claim 1 wherein the plurality of instructions, when executed by at least one processor, further causes the at least one processor to increment a player score in response to game play resulting from the input.

3. The non-transitory computer readable medium of claim 2 wherein the plurality of instructions, when executed by at least one processor, further causes the at least one processor to award a prize when the player score meets a predefined criterion.

4. The non-transitory computer readable medium of claim 1 wherein the plurality of instructions, when executed by at least one processor, further causes the at least one processor to deduct the wager prior to displaying the entertainment game.

5. The non-transitory computer readable medium of claim 1 wherein the plurality of instructions, when executed by at least one processor, further causes the at least one processor to provide the player an opportunity to cash out any remaining credits on the credit balance and end game play after running the gambling game.

6. The non-transitory computer readable medium of claim 1 wherein the plurality of instructions, when executed by at least one processor, further causes the at least one processor to automatically trigger the gambling game during play of the instance of the entertainment game regardless of the predefined outcome in the entertainment game.

7. The non-transitory computer readable medium of claim 1 wherein the plurality of instructions, when executed by at least one processor, further causes the at least one processor to:
    display the entertainment game on the at least one video display only during play of the entertainment game; and
    display the gambling game on the at least one video display only during play of the gambling game.

8. The non-transitory computer readable medium of claim 7 wherein the plurality of instructions, when executed by at least one processor, further causes the at least one processor to replace the display of the entertainment game with the gambling game when the gambling game is automatically triggered.

9. A non-transitory computer readable medium that stores a plurality of instructions, which when executed by at least one processor causes the at least one processor to:
    (a) display an entertainment game on at least one video display, the entertainment game including a plurality of different symbol images on the display;
    (b) display a gambling game on the at least one video display;
    (c) initiate play of an instance of the entertainment game responsive to an input from a player;
    (d) permit the player to move symbol images in the entertainment game responsive to receiving a second input from the player;
    (e) automatically trigger the gambling game during play of the instance of the entertainment game responsive to a plurality of immediately adjacent symbol images that create a predefined combination of symbols;
    (g) award player points in the entertainment game for so moving at least some of the symbol images;
    (h) automatically deduct a wager from a credit balance prior to running the gambling game;

(i) thereafter run the gambling game including selecting a random outcome for the gambling game;
(j) conclude the gambling game, including crediting the player with an award if the random outcome of the gambling game corresponds to an award in the gambling game;
(k) return to play of the same instance of the entertainment game after a conclusion of the gambling game; and
(l) repeat (c) through (k) for the same instance of the entertainment game responsive to additional inputs from the player.

10. The non-transitory computer readable medium of claim 9 wherein the plurality of instructions, when executed by at least one processor, further causes the at least one processor to automatically trigger the gambling game during play of the instance of the entertainment game regardless of the symbol images in the entertainment game.

11. The non-transitory computer readable medium of claim 9 wherein the plurality of instructions, when executed by at least one processor, further causes the at least one processor to deduct the wager prior to displaying the entertainment game.

12. The non-transitory computer readable medium of claim 9 wherein the plurality of instructions, when executed by at least one processor, further causes the at least one processor to provide the player an opportunity to cash out any remaining credits on the credit balance and end game play after running the gambling game.

13. The non-transitory computer readable medium of claim 9 wherein the plurality of instructions, when executed by at least one processor, further causes the at least one processor to display a grid of symbols.

14. The non-transitory computer readable medium of claim 13 wherein the plurality of instructions, when executed by at least one processor, further causes the at least one processor to receive a selection of a symbol in the grid of symbols to switch with an adjacent symbol.

15. The non-transitory computer readable medium of claim 14 wherein the plurality of instructions, when executed by at least one processor, further causes the at least one processor to:
replace each symbol of the predefined combination of symbols in the entertainment game with one or more reels; and
spin each of the one or more reels when the selection of a symbol in the grid of symbols results in the predefined combination of symbols.

16. The non-transitory computer readable medium of claim 14 wherein the plurality of instructions, when executed by at least one processor, further causes the at least one processor to replace each symbol of the predefined combination of symbols with one or more playing cards when the selection of a symbol in the grid of symbols results in the predefined combination of symbols.

17. The non-transitory computer readable medium of claim 16 wherein the plurality of instructions, when executed by at least one processor, further causes the at least one processor to sum a point value of each playing card of the one or more playing cards and compare the point value to a prize schedule.

18. The non-transitory computer readable medium of claim 16 wherein the plurality of instructions, when executed by at least one processor, further causes the at least one processor to consider at least one playing card of the one or more playing cards as a poker hand and analyzing the poker hand for winning combinations of cards.

19. The non-transitory computer readable medium of claim 9 wherein the plurality of instructions, when executed by at least one processor, further causes the at least one processor to:
display the entertainment game on the at least one video display only during play of the entertainment game; and
display the gambling game on the at least one video display only during play of the gambling game.

20. The non-transitory computer readable medium of claim 19 wherein the plurality of instructions, when executed by at least one processor, further causes the at least one processor to replace the display of the entertainment game with the gambling game when the gambling game is automatically triggered.

* * * * *